US011902634B2

(12) United States Patent
Wang et al.

(10) Patent No.: US 11,902,634 B2
(45) Date of Patent: Feb. 13, 2024

(54) ASSOCIATING FILE FORMAT OBJECTS AND DYNAMIC ADAPTIVE STREAMING OVER HYPERTEXT TRANSFER PROTOCOL (DASH) OBJECTS

(71) Applicant: Huawei Technologies Co., Ltd., Shenzhen (CN)

(72) Inventors: Ye-Kui Wang, San Diego, CA (US); Yuqun Fan, Shenzhen (CN); Peiyun Di, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 17/063,440

(22) Filed: Oct. 5, 2020

(65) Prior Publication Data

US 2021/0021909 A1 Jan. 21, 2021

Related U.S. Application Data

(63) Continuation of application No. PCT/US2019/025631, filed on Apr. 3, 2019.

(60) Provisional application No. 62/654,034, filed on Apr. 6, 2018.

(51) Int. Cl.
*H04N 21/81* (2011.01)
*H04N 21/218* (2011.01)
*H04N 21/2343* (2011.01)
*H04N 21/84* (2011.01)

(52) U.S. Cl.
CPC ..... *H04N 21/816* (2013.01); *H04N 21/21805* (2013.01); *H04N 21/2343* (2013.01); *H04N 21/84* (2013.01)

(58) Field of Classification Search
None
See application file for complete search history.

(56) References Cited

U.S. PATENT DOCUMENTS

| 2012/0102042 | A1 | 4/2012 | Flick et al. |
| 2015/0026358 | A1 | 1/2015 | Zhang et al. |
| 2017/0099513 | A1 | 4/2017 | Furbeck |
| 2017/0142480 | A1 | 5/2017 | Gupta et al. |

(Continued)

FOREIGN PATENT DOCUMENTS

| CN | 105230024 A | 1/2016 |
| KR | 20160135660 A | 11/2016 |

OTHER PUBLICATIONS

"Information technology—Coded representation of immersive media (MPEG -I)—Part 2: Omnidirectional media format," MPEG Meeting, ISO/IEC JTC1/SC291WG11, No. n17399, Feb. 7, 2018, XP030024044, 181 pages.

(Continued)

*Primary Examiner* — Omar S Parra
(74) *Attorney, Agent, or Firm* — Conley Rose, P.C.

(57) ABSTRACT

A method comprises obtaining media content associated with a first viewpoint and a second viewpoint, wherein a first position of the first viewpoint is static and a second position of the second viewpoint is dynamic; generating a first VWPT descriptor based on the media content and describing the first viewpoint; generating a second VWPT descriptor based on the media content and describing the second viewpoint; generating an MPD comprising the first VWPT descriptor and the second VWPT descriptor; and transmitting the MPD.

20 Claims, 14 Drawing Sheets

(56) References Cited

U.S. PATENT DOCUMENTS

| | | | |
|---|---|---|---|
| 2017/0353743 A1 | 12/2017 | Oyman | |
| 2018/0061002 A1 | 3/2018 | Lee et al. | |
| 2019/0313081 A1* | 10/2019 | Oh | H04N 13/178 |
| 2021/0029294 A1* | 1/2021 | Deshpande | H04N 5/23238 |
| 2021/0195162 A1* | 6/2021 | Chupeau | H04N 21/21805 |

OTHER PUBLICATIONS

"Information Technology—Dynamic adaptive streaming over HTTP (DASH)—Part 1: Media presentation description and segment formats," ISO/IEC JTC1/SC29, 23009-1, Jan. 5, 2012, 133 pages.
Moats, R., "URN Syntax," RFC 2141, May 1997, 8 pages.
Berners-Lee, T., et al., "Uniform Resource Identifier (URI): Generic Syntax," RFC 3986, Jan. 2005, 61 pages.
"3rd Generation Partnership Project;Technical Specification Group Services and System Aspects; Transparent end-to-end packet switched streaming service (PSS); 3GPP file format (3GP) (Release 16)," 3GPP TS 26.244 V16.1.0, Sep. 2020, 68 pages.
"Information technology—Coding of audio-visual objects—Part 12: ISO base media file format," ISO/IEC 14496-12, Fifth edition, Dec. 15, 2015, 248 pages.
"Information technology—Coding of audio-visual objects—Part 14: MP4 file format," ISO/IEC 14496-14, Second edition, Nov. 2018, 22 pages.
"Information technology—Coding of audio-visual objects—Part 15: Advanced Video Coding (AVC) file format," ISO/IEC 14496-15, First edition: Apr. 15, 2004, 29 pages.
"Line Transmission of Non-Telephone Signals; Video Codec for Audiovisualservices At p × 64 kbits," ITU-T Recommendation H.261, Mar. 1993, 29 pages.
"Transmission of Non_Telephone Signals; Information Technology—Generic Coding of Moving Pictures and Associated Audio Information: Video," ITU-T Recommendation H.262, Jul. 1995, 211 pages.
"Series H: Audiovisual and Multimedia Systems Infrastructure of audiovisual services—Coding of moving video; Video coding for low bit rate communication," ITU-T Recommendation H.263, Jan. 2005, 226 pages.
"Series H: Audiovisual and Multimedia Systems Infrastructure of audiovisual services—Coding of moving video; Advanced video coding for generic audiovisual services," Recommendation ITU-T H.264, Jun. 2019, 836 pages.
"Series H: Audiovisual and Multimedia Systems Infrastructure of audiovisual services Coding of moving video; High efficiency video coding," Recommendation ITU-T H.265, Apr. 2013, 317 pages.
Huawei Technologies, "[OMAF] On multiple viewpoints," ISO/IEC JTC1/SC29/WG11 MPEG2018/M4xxxx, Apr. 2018, 6 pages.
Systems, "WD 1 of ISO/IEC 23090-2 OMAF 2nd edition," ISO/IEC JTC1/SC29/WG11 N17584, Apr. 2018, 188 pages.
Systems, "WD 3 of ISO/IEC 23090-2 OMAF 2nd Edition," ISO/IEC JTC1/SC29/WG11 N17963-v1, Oct. 2018, 232 pages.

* cited by examiner

US 11,902,634 B2

ASSOCIATING FILE FORMAT OBJECTS AND DYNAMIC ADAPTIVE STREAMING OVER HYPERTEXT TRANSFER PROTOCOL (DASH) OBJECTS

CROSS-REFERENCE TO RELATED APPLICATIONS

This is a continuation of Int'l Patent App. No. PCT/US2019/025631 filed on Apr. 3, 2019, which claims priority to U.S. Prov. Patent App. No. 62/654,034 filed on Apr. 6, 2018, both of which are incorporated by reference.

TECHNICAL FIELD

The disclosed objects relate to video coding in general and associating file format objects and Dynamic Adaptive Streaming over Hypertext Transfer Protocol (DASH) objects in particular.

BACKGROUND

Virtual Reality (VR), which may also be known as omnidirectional media, immersive media, and/or three hundred sixty degree media, is an interactive recorded and/or computer-generated experience taking place within a simulated environment and employing visual, audio, and/or haptic feedback. For a visual perspective, VR provides a sphere (or sub-portion of a sphere) of imagery with a user positioned at the center of the sphere. The sphere of imagery can be rendered by a head-mounted display (HMD) or other display unit. Specifically, a VR display allows a user to view a sub-portion of the sphere through a field of view (FOV), which is also known as a viewport. The user can dynamically change the position and/or angle of the viewport to experience the environment presented by the VR video. Each picture, also known as a frame, of the VR video includes both the area of the sphere inside the user's FOV and the area of the sphere outside the user's FOV. Hence, a VR frame includes significantly more data than a non-VR video image. Content providers are interested in providing VR video on a streaming basis. However, VR video includes significantly more data and different attributes than traditional video. As such, streaming mechanisms for traditional video are not designed to efficiently stream VR video.

SUMMARY

A first aspect relates to a method comprising obtaining media content associated with a viewpoint; generating a viewpoint information (VWPT) descriptor based on the media content, wherein the VWPT descriptor comprises a value indicating whether a position of the viewpoint is static; generating a media presentation description (MPD) comprising the VWPT descriptor; and transmitting the MPD.

In a first implementation form of the method according to the first aspect as such, the value is an is_static value.

In a second implementation form of the method according to the first aspect as such or any preceding implementation form of the first aspect, the is static value is the only value in the VWPT descriptor that indicates whether the position of the viewpoint is static or dynamic.

In a third implementation form of the method according to the first aspect as such or any preceding implementation form of the first aspect, the value being equal to "true" indicates that the position of the viewpoint is static.

In a fourth implementation form of the method according to the first aspect as such or any preceding implementation form of the first aspect, the value being equal to "false" indicates that the position of the viewpoint is dynamic.

In a fifth implementation form of the method according to the first aspect as such or any preceding implementation form of the first aspect, wherein the VWPT descriptor further comprises a viewpoint identifier (ID) value that specifies a viewpoint ID of the viewpoint.

In a sixth implementation form of the method according to the first aspect as such or any preceding implementation form of the first aspect, wherein the VWPT descriptor further comprises a center x value that specifies an absolute position of a center of the viewpoint in global three-dimensional coordinates on an x-axis.

In a seventh implementation form of the method according to the first aspect as such or any preceding implementation form of the first aspect, the VWPT descriptor further comprises a center y value that specifies the absolute position of the center of the viewpoint in the global three-dimensional coordinates on a y-axis.

In an eighth implementation form of the method according to the first aspect as such or any preceding implementation form of the first aspect, the VWPT descriptor further comprises a center z value that specifies the absolute position of the center of the viewpoint in the global three-dimensional coordinates on a z-axis.

A second aspect relates to an apparatus comprising a memory; and a processor coupled to the memory and configured to perform any of the first aspect as such or any preceding implementation form of the first aspect.

A third aspect relates to a computer program product comprising computer-executable instructions stored on a non-transitory medium that when executed by a processor cause an apparatus to perform any of the first aspect as such or any preceding implementation form of the first aspect.

A fourth aspect relates to a method comprising transmitting a request for an MPD; receiving the MPD in response to the request, wherein the MPD comprises a VWPT descriptor based on media content associated with a viewpoint, and wherein the VWPT descriptor comprises a value indicating whether a position of the viewpoint is static; and processing the MPD.

In a first implementation form of the method according to the fourth aspect as such, the value is an is static value.

In a second implementation form of the method according to the fourth aspect as such or any preceding implementation form of the fourth aspect, the is static value is the only value in the VWPT descriptor that indicates whether the position of the viewpoint is static or dynamic.

In a third implementation form of the method according to the fourth aspect as such or any preceding implementation form of the fourth aspect, the value being equal to "true" indicates that the position of the viewpoint is static.

In a fourth implementation form of the method according to the fourth aspect as such or any preceding implementation form of the fourth aspect, the value being equal to "false" indicates that the position of the viewpoint is dynamic.

In a fifth implementation form of the method according to the fourth aspect as such or any preceding implementation form of the fourth aspect, the VWPT descriptor further comprises a viewpoint ID value that specifies a viewpoint ID of the viewpoint.

In a sixth implementation form of the method according to the fourth aspect as such or any preceding implementation form of the fourth aspect, the VWPT descriptor further comprises a center x value that specifies an absolute position of a center of the viewpoint in global three-dimensional coordinates on an x-axis.

In a seventh implementation form of the method according to the fourth aspect as such or any preceding implementation form of the fourth aspect, the VWPT descriptor further comprises a center y value that specifies the absolute position of the center of the viewpoint in the global three-dimensional coordinates on a y-axis.

In an eighth implementation form of the method according to the fourth aspect as such or any preceding implementation form of the fourth aspect, the VWPT descriptor further comprises a center z value that specifies the absolute position of the center of the viewpoint in the global three-dimensional coordinates on a z-axis.

A ninth aspect relates to an apparatus comprising a memory; and a processor coupled to the memory and configured to perform any of the fourth aspect as such or any preceding implementation form of the fourth aspect.

A tenth aspect relates to a computer program product comprising computer-executable instructions stored on a non-transitory medium that when executed by a processor cause an apparatus to perform any of the fourth aspect as such or any preceding implementation form of the fourth aspect.

An eleventh aspect relates to a method comprising obtaining media content; generating a timed metadata representation based on the media content, and wherein the timed metadata representation is independent of an @associationId attribute, an @associationAsId attribute, an @associationVwptId attribute, and an @associationPsId attribute; generating an MPD comprising the timed metadata representation; and transmitting the MPD.

In a first implementation form of the method according to the eleventh aspect as such, the timed metadata representation is further independent of any other such attribute for association of the timed metadata representation to other DASH objects.

In a second implementation form of the method according to the eleventh aspect as such or any preceding implementation form of the first aspect, the timed metadata track applies to an entire media presentation.

A twelfth aspect relates to an apparatus comprising a memory; and a processor coupled to the memory and configured to perform any of the eleventh aspect as such or any preceding implementation form of the eleventh aspect.

A thirteenth aspect relates to a computer program product comprising computer-executable instructions stored on a non-transitory medium that when executed by a processor cause an apparatus to perform any of the eleventh aspect as such or any preceding implementation form of the eleventh aspect.

A fourteenth aspect relates to a method comprising transmitting a request for an MPD; receiving the MPD in response to the request, wherein the MPD comprises a timed metadata representation based on media content, and wherein the timed metadata representation is independent of an @associationId attribute, an @associationAsId attribute, an @associationVwptId attribute, and an @associationPsId attribute; and processing the MPD.

In a first implementation form of the method according to the fourteenth aspect as such, the timed metadata representation is further independent of any other such attribute for association of the timed metadata representation to other DASH objects.

In a second implementation form of the method according to the fourteenth aspect as such or any preceding implementation form of the fourteenth aspect, the timed metadata track applies to an entire media presentation.

A fifteenth aspect relates to an apparatus comprising a memory; and a processor coupled to the memory and configured to perform any of the fourteenth aspect as such or any preceding implementation form of the fourteenth aspect.

A sixteenth aspect relates to a computer program product comprising computer-executable instructions stored on a non-transitory medium that when executed by a processor cause an apparatus to perform any of the fourteenth aspect as such or any preceding implementation form of the fourteenth aspect.

A seventeenth aspect relates to a method comprising obtaining media content; generating a timed metadata track based on the media content, wherein the timed metadata track is independent of a 'cdsc' track reference; generating a file format object comprising the timed metadata track; and transmitting the file format object.

In a first implementation form of the method according to the seventeenth aspect as such, the 'cdsc' track reference indicates the timed metadata track describes each media track individually.

In a second implementation form of the method according to the seventeenth aspect as such or any preceding implementation form of the seventeenth aspect, the timed metadata track applies to an entire movie.

An eighteenth aspect relates to an apparatus comprising a memory; and a processor coupled to the memory and configured to perform any of the seventeenth aspect as such or any preceding implementation form of the seventeenth aspect.

A nineteenth aspect relates to a computer program product comprising computer-executable instructions stored on a non-transitory medium that when executed by a processor cause an apparatus to perform any of the seventeenth aspect as such or any preceding implementation form of the seventeenth aspect.

A twentieth aspect relates to a method comprising transmitting a request for a file format object; receiving the file format object in response to the request, wherein the file format object comprises a timed metadata track based on media content, and wherein the timed metadata track is independent of a 'cdsc' track reference; and processing the file format object.

In a first implementation form of the method according to the first twentieth as such, the 'cdsc' track reference indicates the timed metadata track describes each media track individually.

In a second implementation form of the method according to the twentieth aspect as such or any preceding implementation form of twentieth first aspect, the timed metadata track applies to an entire movie.

A twenty-first aspect relates to an apparatus comprising a memory; and a processor coupled to the memory and configured to perform any of the twentieth aspect as such or any preceding implementation form of the twentieth aspect.

A twenty-second aspect relates to a computer program product comprising computer-executable instructions stored on a non-transitory medium that when executed by a processor cause an apparatus to perform any of the twentieth aspect as such or any preceding implementation form of the twentieth aspect.

A twenty-third aspect relates to a method comprising obtaining media content associated with a first viewpoint and a second viewpoint, wherein a first position of the first viewpoint is static and a second position of the second viewpoint is dynamic; generating a first VWPT descriptor based on the media content and describing the first viewpoint; generating a second VWPT descriptor based on the media content and describing the second viewpoint; generating an MPD comprising the first VWPT descriptor and the second VWPT descriptor; and transmitting the MPD.

In a first implementation form of the method according to the twenty-third aspect as such, the second viewpoint is associated with a timed metadata representation comprising a timed metadata track, and wherein the timed metadata track comprises information describing the second position.

In a second implementation form of the method according to the twenty-third aspect as such or any preceding implementation form of the twenty-third aspect, the first VWPT descriptor comprises a first value indicating whether the first position is static, and wherein the second VWPT descriptor comprises a second value indicating whether the second position is static.

In a third implementation form of the method according to the twenty-third aspect as such or any preceding implementation form of the twenty-third aspect, the first value is a first is static value, and wherein the second value is a second is static value.

In a fourth implementation form of the method according to the twenty-third aspect as such or any preceding implementation form of the twenty-third aspect, the first is_static value is the only value in the first VWPT descriptor that indicates whether the first position of the first viewpoint is static or dynamic, and wherein the second is_static value is the only value in the second VWPT descriptor that indicates whether the second position of the second viewpoint is static or dynamic.

In a fifth implementation form of the method according to the twenty-third aspect as such or any preceding implementation form of the twenty-third aspect, the first value being equal to "true" indicates that the position of the viewpoint is static, and wherein the second value being equal to "true" indicates that the position of the viewpoint is static.

In a sixth implementation form of the method according to the twenty-third aspect as such or any preceding implementation form of the twenty-third aspect, the first value being equal to "false" indicates that the position of the viewpoint is dynamic, and wherein the second value being equal to "false" indicates that the position of the viewpoint is dynamic.

In a seventh implementation form of the method according to the twenty-third aspect as such or any preceding implementation form of the twenty-third aspect, the first VWPT descriptor further comprises a first viewpoint ID value that specifies a first viewpoint ID of the first viewpoint, and wherein the second VWPT descriptor further comprises a second viewpoint ID value that specifies a second viewpoint ID of the second viewpoint.

In an eighth implementation form of the method according to the twenty-third aspect as such or any preceding implementation form of the twenty-third aspect, the first VWPT descriptor further comprises a first center x value that specifies a first absolute position of a first center of the first viewpoint in global three-dimensional coordinates on an x-axis, and wherein the second VWPT descriptor further comprises a second center x value that specifies a second absolute position of a second center of the second viewpoint in the global three-dimensional coordinates on the x-axis.

In a ninth implementation form of the method according to the twenty-third aspect as such or any preceding implementation form of the twenty-third aspect, the first VWPT descriptor further comprises a first center y value that specifies a first absolute position of a first center of the first viewpoint in the global three-dimensional coordinates on a y-axis, and wherein the second VWPT descriptor further comprises a second center y value that specifies a second absolute position of a second center of the second viewpoint in the global three-dimensional coordinates on the y-axis.

In a tenth implementation form of the method according to the twenty-third aspect as such or any preceding implementation form of the twenty-third aspect, the first VWPT descriptor further comprises a first center z value that specifies a first absolute position of a first center of the first viewpoint in the global three-dimensional coordinates on a z-axis, and wherein the second VWPT descriptor further comprises a second center z value that specifies a second absolute position of a second center of the second viewpoint in the global three-dimensional coordinates on the z-axis.

A twenty-fourth aspect relates to an apparatus comprising a memory; and a processor coupled to the memory and configured to perform any of the twenty-third aspect as such or any preceding implementation form of the twenty-third aspect.

A twenty-fifth aspect relates to a computer program product comprising computer-executable instructions stored on a non-transitory medium that when executed by a processor cause an apparatus to perform any of the twenty-third aspect as such or any preceding implementation form of the twenty-third aspect.

A twenty-sixth aspect relates to a method comprising transmitting a request for an MPD; receiving the MPD in response to the request, wherein the MPD comprises a first VWPT descriptor and a second VWPT descriptor, wherein the first VWPT descriptor is based on media content and describes a first viewpoint, wherein a first position of the first viewpoint is static, wherein the second VWPT descriptor is based on the media content and describes a second viewpoint, and wherein a second position of the second viewpoint is dynamic; and processing the MPD.

In a first implementation form of the method according to the twenty-sixth aspect as such, the second viewpoint is associated with a timed metadata representation comprising a timed metadata track, and wherein the timed metadata track comprises information describing the second position.

In a second implementation form of the method according to the twenty-sixth aspect as such or any preceding implementation form of the twenty-sixth aspect, the first VWPT descriptor comprises a first value indicating whether the first position is static, and wherein the second VWPT descriptor comprises a second value indicating whether the second position is static.

In a third implementation form of the method according to the twenty-sixth aspect as such or any preceding implementation form of the twenty-sixth aspect, the first value is a first is static value, and wherein the second value is a second is static value.

In a fourth implementation form of the method according to the twenty-sixth aspect as such or any preceding implementation form of the twenty-sixth aspect, the first is_static value is the only value in the first VWPT descriptor that indicates whether the first position of the first viewpoint is static or dynamic, and wherein the second is_static value is the only value in the second VWPT descriptor that indicates whether the second position of the second viewpoint is static or dynamic.

In a fifth implementation form of the method according to the twenty-sixth aspect as such or any preceding implementation form of the twenty-sixth aspect, the first value being equal to "true" indicates that the position of the viewpoint is static, and wherein the second value being equal to "true" indicates that the position of the viewpoint is static.

In a sixth implementation form of the method according to the twenty-sixth aspect as such or any preceding implementation form of the twenty-sixth aspect, the first value being equal to "false" indicates that the position of the viewpoint is dynamic, and wherein the second value being equal to "false" indicates that the position of the viewpoint is dynamic.

In a seventh implementation form of the method according to the twenty-sixth aspect as such or any preceding implementation form of the twenty-sixth aspect, the first VWPT descriptor further comprises a first viewpoint ID value that specifies a first viewpoint ID of the first viewpoint, and wherein the second VWPT descriptor further comprises a second viewpoint ID value that specifies a second viewpoint ID of the second viewpoint.

In an eighth implementation form of the method according to the twenty-sixth aspect as such or any preceding implementation form of the twenty-sixth aspect, the first VWPT descriptor further comprises a first center x value that specifies a first absolute position of a first center of the first viewpoint in global three-dimensional coordinates on an x-axis, and wherein the second VWPT descriptor further comprises a second center x value that specifies a second absolute position of a second center of the second viewpoint in the global three-dimensional coordinates on the x-axis.

In a ninth implementation form of the method according to the twenty-sixth aspect as such or any preceding implementation form of the twenty-sixth aspect, the first VWPT descriptor further comprises a first center y value that specifies a first absolute position of a first center of the first viewpoint in the global three-dimensional coordinates on a y-axis, and wherein the second VWPT descriptor further comprises a second center y value that specifies a second absolute position of a second center of the second viewpoint in the global three-dimensional coordinates on the y-axis.

In a tenth implementation form of the method according to the twenty-sixth aspect as such or any preceding implementation form of the twenty-sixth aspect, the first VWPT descriptor further comprises a first center z value that specifies a first absolute position of a first center of the first viewpoint in the global three-dimensional coordinates on a z-axis, and wherein the second VWPT descriptor further comprises a second center z value that specifies a second absolute position of a second center of the second viewpoint in the global three-dimensional coordinates on the z-axis.

A twenty-seventh aspect relates to an apparatus comprising a memory; and a processor coupled to the memory and configured to perform any of the twenty-sixth aspect as such or any preceding implementation form of the twenty-sixth aspect.

A twenty-eighth aspect relates to a computer program product comprising computer-executable instructions stored on a non-transitory medium that when executed by a processor cause an apparatus to perform any of the twenty-sixth aspect as such or any preceding implementation form of the twenty-sixth aspect.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
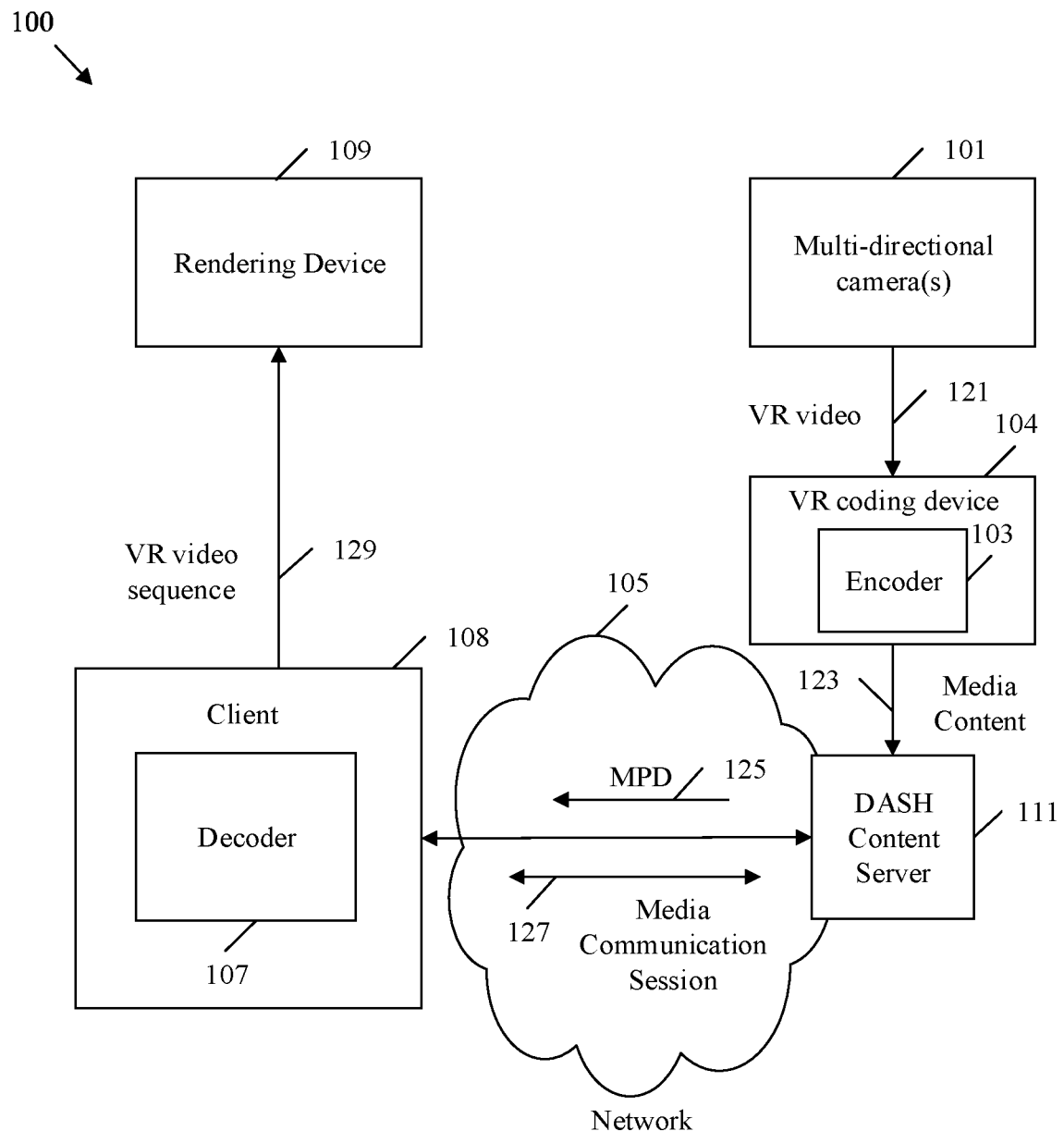
FIG. 1 is a schematic diagram of an example system for VR based video streaming.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
ASIC: application-specific integrated circuit
CPU: central processing unit
DASH: Dynamic Adaptive Streaming over HTTP
DSP: digital signal processor
EO: electrical-to-optical
FOV: field of view
FPGA: field-programmable gate array
HMD: head-mounted display
HTTP: Hypertext Transfer Protocol
ID: identifier
I/O: input and/or output
IPD: interpupillary distance ISO: The International Organization for Standardization
ISOBMFF: ISO base media file format
LTE: Long Term Evolution
MPD: media presentation description
OE: optical-to-electrical
OMAF: Omnidirectional MediA Format
PC: personal computer
RAM: random-access memory
ROM: read-only memory
SRAM: static RAM
TCAM: ternary content-addressable memory
Tx/Rx: transceiver unit
URL: Uniform Resource Locator
VM: virtual machine
VR: virtual reality
VWPT: viewpoint information
XML: Extensible Markup Language.

DASH is a mechanism for streaming video data across a network. DASH provides an MPD file that describes a video to a client. Specifically, an MPD describes various representations of a video as well as the location of such representations. The representations may include the same video content at different resolutions. The client can obtain video segments from the representations for display to the client. Specifically, the client can monitor the video buffer and/or network communication speed and dynamically change video resolution based on current conditions by switching between representations based on data in the MPD.

DASH allows representations to be associated with other representations. For example, video representations can be associated with representations that include timed metadata. Such metadata may provide data indicating how video frames should be presented. Such data may be referred to as hints and the representation may be referred to as a hint track. In DASH, each representation can be associated with the representation containing the relevant hint track. Applying such a scheme to VR video may be problematic.

First, a VR video can include multiple video streams simultaneously captured from multiple positions known as viewpoints. A user can be allowed to swap between viewpoints during the course of the video. Accordingly, each viewpoint includes a plurality of representations. In such a case, a timed metadata representation may contain a recommended viewport, which indicates a suggested viewpoint and a recommended FOV from that viewpoint at any specified point in time. This allows the user the option of relinquishing control of the VR experience (e.g., in case the user wishes to allow the content producer to determine where to look). In order to implement this scheme, every representation from every viewpoint is associated with the timed metadata representation. When a large number of representations are present, this approach results in a large MPD as each association is recorded for each representation.

Second, viewpoints in DASH can be identified based on a viewpoint ID and/or position data. In some cases, a viewpoint may change position over time. For example, a camera can be mounted on a rail and move to capture different areas of the recorded environment. In this case, the position information changes. DASH mechanisms may be unable to clearly determine that certain elements are associated with the same viewpoint due to differing position information for the viewpoint at different times.

Third, DASH lacks a single MPD descriptor that indicates both static viewpoints and dynamic viewpoints. In addition, there lacks a means for such a descriptor to have a single value that indicates whether associated viewpoints are static or dynamic.

Fourth, timed metadata representations often apply to entire media presentations. However, DASH lacks a way to associate timed metadata representations to entire media presentations.

Fifth, timed metadata tracks often apply to entire movies. However, file formats lack a way to associate timed metadata tracks to entire movies.

Disclosed herein are embodiments for associating file format objects and DASH objects. To solve the first problem discussed above, association ID attributes are introduced that allow DASH objects to refer to other DASH objects at different levels of specificity (e.g., beyond a strict representation to representation association). For example, DASH organizes representations into adaptation sets, where an adaptation set contains representations that are interchangeable at run time (e.g., representations containing the same video data at different resolutions). When different viewpoints are employed, each viewpoint may include one or more adaptation sets with one or more corresponding representations. Further, an MPD can contain preselections, which are a combination of adaptation sets that form a specific experience and are selected by a content provider to be rendered as a group (e.g., an audio track adaptation set and a video adaptation set associated with a common viewpoint). The association IDs disclosed herein can associate representations to adaptation sets, representations to viewpoints, representations to preselections, adaptation sets to viewpoints, adaptation sets to preselections, viewpoints to preselections, vice versa, and any combination or subcombination thereof. For example, the association IDs can include an association ID (@associationId) attribute, an association viewpoint ID (@associationVwptId) attribute, an association adaptation set ID (@associationAsId), an association preselection ID (@associationPsId), or combinations thereof. To solve the second problem above, viewpoint elements are considered as equivalent when viewpoint IDs are equivalent, regardless of viewpoint position information. To solve the third problem, a viewpoint descriptor indicates both static viewpoints and dynamic viewpoints. In addition, the viewpoint descriptor may comprise a single value that indicates whether associated viewpoints are static or dynamic. To solve the fourth problem above, various attributes are omitted from timed metadata representations. To solve the fifth problem above, a track reference is omitted from a timed metadata track.

FIG. 1 is a schematic diagram of an example system 100 for VR based video streaming. System 100 includes a multi-directional camera 101, a VR coding device 104 including an encoder 103, a DASH content server 111, a client 108 with a decoder 107, and a rendering device 109. The multi-directional camera 101 comprises an array of camera devices. Each camera device is pointed at a different angle so that the multi-directional camera 101 can take multiple directional video streams of the surrounding environment from a plurality of angles. For example, multi-directional camera 101 can take VR video 121 of the environment as a sphere with the multi-directional camera 101 at the center of the sphere. As used herein, sphere and spherical video refer to both a geometrical sphere and sub-portions of a geometrical sphere, such as spherical caps, spherical domes, spherical segments, etc. For example, a multi-directional camera 101 may take a one hundred and eighty degree video to cover half of the environment so that a production crew can remain behind the multi-directional camera 101. A multi-directional camera 101 can also take VR video 121 in three hundred sixty degrees (or any sub-portion thereof). However, a portion of the floor under the multi-directional camera 101 may be omitted, which results in video of less than a perfect sphere. Hence, the term sphere, as used herein, is a general term used for clarity of discussion and should not be considered limiting from a geometrical stand point. It should be noted that multi-directional camera 101 as described is an example camera capable of capturing VR video 121, and that other camera devices may also be used to capture VR video (e.g., a camera, a fisheye lens).

The VR video 121 from the multi-directional camera 101 is forwarded to the VR coding device 104. The VR coding device 104 may be a computing system including specialized VR coding software. The VR coding device 104 may include an encoder 103. In some examples, the encoder 103 can also be included in a separate computer system from the VR coding device 104. The VR coding device 104 is configured to convert the multiple directional video streams in the VR video 121 into a single multiple directional video stream including the entire recorded area from all relevant angles. This conversion may be referred to as image stitching. For example, frames from each video stream that are captured at the same time can be stitched together to create a single spherical image. A spherical video stream can then be created from the spherical images. For clarity of discussion, it should be noted that the terms frame, picture, and image may be used interchangeably herein unless specifically noted.

The spherical video stream can then be forwarded to the encoder 103 for compression. An encoder 103 is a device and/or program capable of converting information from one format to another for purposes of standardization, speed, and/or compression. Standardized encoders 103 are configured to encode rectangular and/or square images. Accordingly, the encoder 103 is configured to map each spherical image from the spherical video stream into a plurality of rectangular sub-pictures. The sub-pictures can then be placed in separate sub-picture video streams. As such, each sub-picture video stream displays a stream of images over time as recorded from a sub-portion of the spherical video stream. The encoder 103 can then encode each sub-picture video stream to compress the video stream to a manageable file size. In general, the encoder 103 partitions each frame from each sub-picture video stream into pixel blocks, compresses the pixel blocks by inter-prediction and/or intra-prediction to create coding blocks including prediction blocks and residual blocks, applies transforms to the residual blocks for further compression, and applies various filters to the blocks. The compressed blocks as well as corresponding syntax are stored in bitstream(s), for example as tracks in ISOBMFF and/or in OMAF.

The encoded tracks from the VR video 121, including the compressed blocks and associated syntax, form part of the media content 123. The media content 123 may include encoded video files, encoded audio files, combined audio video files, media represented in multiple languages, subtitled media, metadata, or combinations thereof. The media content 123 can be separated into adaptation sets. For example, video from a viewpoint can be included in an adaptation set, audio can be included in another adaptation set, closed captioning can be included in another adaptation set, metadata can be included in another adaptation set, etc. Adaptation sets contain media content 123 that is not interchangeable with media content 123 from other adaptation sets. The content in each adaptation set can be stored in representations, where representations in the same adaptation set are interchangeable. For example, VR video 121 from a single viewpoint can be downsampled to various resolutions and stored in corresponding representations. As another example, audio (e.g., from a single viewpoint) can be downsampled to various qualities, translated into different languages, etc. and stored in corresponding representations.

The media content 123 can be forwarded to a DASH content server 111 for distribution to end users over a network 105. The DASH content server 111 may be any device configured to serve HTTP requests from a client. The DASH content server 111 may comprise a dedicated server, a server cluster, a VM in a cloud computing environment, or any other suitable content management entity. The DASH content server 111 may receive media content 123 from the VR coding device 104. The DASH content server 111 may generate an MPD 125 describing the media content 123. For example, the MPD 125 can describe preselections, viewpoints, adaptation sets, representations, metadata tracks, segments thereof, etc., as well as locations where such items can be obtained via an HTTP request (e.g., an HTTP GET).

A client 108 with a decoder 107 may enter a media communication session 127 with the DASH content server 111 to obtain the media content 123 via a network 105, which may include the Internet, a mobile telecommunications network (e.g., an LTE-based data network), or other data communication data system. The client 108 may be any user-operated device for viewing video content from the media content 123, such as a computer, television, tablet device, smart phone, etc. The media communication session 127 may include making a media request, such as an HTTP-based request (e.g., an HTTP GET request). In response to receiving an initial media request, the DASH content server 111 can forward the MPD 125 to the client 108. The client 108 can then employ the information in the MPD 125 to make additional media requests for the media content 123 as part of the media communication session 127. Specifically, the client 108 can employ the data in the MPD 125 to determine which portions of the media content 123 should be obtained, for example based on user preferences, user selections, buffer/network conditions, etc. Upon selecting the relevant portions of the media content 123, the client 108 uses the data in the MPD 125 to address the media request to the location at the DASH content server 111 that contains the relevant data. The DASH content server 111 can then respond to the client 108 with the requested portions of the media content 123. In this way, the client 108 receives requested portions of the media content 123 without having to download the entire media content 123, which saves network resources (e.g., time, bandwidth, etc.) across the network 105.

The decoder 107 is a device at the user's location (e.g., implemented on the client 108) that is configured to reverse the coding process of the encoder 103 to decode the encoded bitstream(s) obtained in representations from the DASH content server 111. The decoder 107 also merges the resulting sub-picture video streams to reconstruct a VR video sequence 129. The VR video sequence 129 contains the portion of the media content 123 as requested by the client 108 based on user selections, preferences, and/or network conditions and as reconstructed by the decoder 107. The VR video sequence 129 can then be forwarded to the rendering device 109. The rendering device 109 is a device configured to display the VR video sequence 129 to the user. For example, the rendering device 109 may include an HMD that is attached to the user's head and covers the user's eyes. The rendering device 109 may include a screen for each eye, cameras, motion sensors, speakers, etc. and may communicate with the client 108 via wireless and/or wired connections. In other examples, the rendering device 109 can be a display screen, such as a television, a computer monitor, a tablet PC, etc. The rendering device 109 may display a sub-portion of the VR video sequence 129 to the user. The sub-portion shown is based on the FOV and/or viewport of the rendering device 109. For example, the rendering device 109 may change the position of the FOV based on user head movement by employing the motion tracking sensors. This allows the user to see different portions of the spherical video stream depending on head movement. In some cases, the rendering device 109 may offset the FOV for each eye based on the user's IPD to create the impression of a three-dimensional space.

Figure 2:
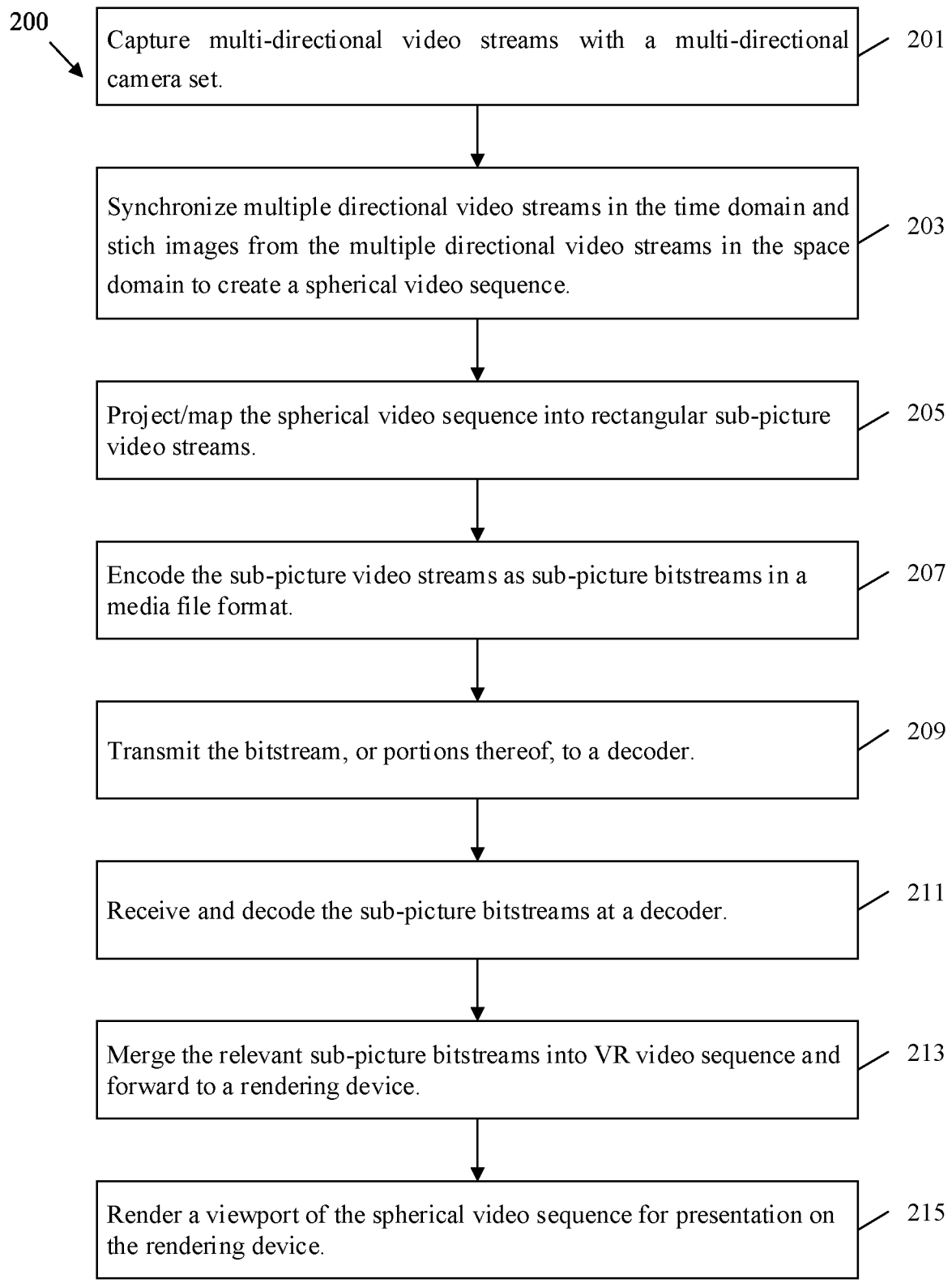
FIG. 2 is a flowchart of an example method of coding a VR video.

FIG. 2 is a flowchart of an example method 200 of coding a VR video, for example by employing the components of system 100. At step 201, a multi-directional camera set, such as multi-directional camera 101, is used to capture multiple directional video streams. The multiple directional video streams include views of an environment at various angles. For example, the multiple directional video streams may capture video from three hundred sixty degrees, one hundred eighty degrees, two hundred forty degrees, etc. around the camera in the horizontal plane. The multiple directional video streams may also capture video from three hundred sixty degrees, one hundred eighty degrees, two hundred forty degrees, etc. around the camera in the vertical plane. The result is to create video that includes information sufficient to cover a spherical area around the camera over some period of time.

At step 203, the multiple directional video streams are synchronized in the time domain. Specifically, each directional video stream includes a series of images taken at a corresponding angle. The multiple directional video streams are synchronized by ensuring frames from each directional video stream that were captured at the same time domain position are processed together. The frames from the directional video streams can then be stitched together in the space domain to create a spherical video stream. Hence, each frame of the spherical video stream contains data taken from the frames of all the directional video streams that occur at a common temporal position.

At step 205, the spherical video stream is mapped into rectangular sub-picture video streams. This process may also be referred to as projecting the spherical video stream into rectangular sub-picture video streams. Encoders and decoders are generally designed to encode rectangular and/or square frames. Accordingly, mapping the spherical video stream into rectangular sub-picture video streams creates video streams that can be encoded and decoded by non-VR specific encoders and decoders, respectively. It should be noted that steps 203 and 205 are specific to VR video processing, and hence may be performed by specialized VR hardware, software, or combinations thereof.

At step 207, the rectangular sub-picture video streams making up the VR video can be forwarded to an encoder, such as encoder 103. The encoder then encodes the sub-picture video streams as sub-picture bitstreams in a corresponding media file format. Specifically, each sub-picture video stream can be treated by the encoder as a video signal. The encoder can encode each frame of each sub-picture video stream via inter-prediction, intra-prediction, etc. Regarding file format, the sub-picture video streams can be stored in ISOBMFF. For example, the sub-picture video streams are captured at a specified resolution. The sub-picture video streams can then be downsampled to various lower resolutions for encoding. Each resolution can be referred to as a representation. Lower quality representations lose image clarity while reducing file size. Accordingly, lower quality representations can be transmitted to a user using fewer network resources (e.g., time, bandwidth, etc.) than higher quality representations with an attendant loss of visual quality. Each representation can be stored in a corresponding set of tracks at a DASH content server, such as DASH content server 111. Hence, tracks can be sent to a user, where the tracks include the sub-picture bitstreams at various resolutions (e.g., visual quality).

At step 209, the sub-picture bitstreams can be sent to the decoder as tracks. Specifically, an MPD describing the various representations can be forwarded to the client from the DASH content server. This can occur in response to a request from the client, such as an HTTP GET request. For example, the MPD may describe various adaptation sets containing various representations. The client can then request the relevant representations, or portions thereof, from the desired adaptation sets.

At step 211, a decoder, such as decoder 107, receives the requested representations containing the tracks of sub-picture bitstreams. The decoder can then decode the sub-picture bitstreams into sub-picture video streams for display. The decoding process involves the reverse of the encoding process (e.g., using inter-prediction and intra-prediction). Then, at step 213, the decoder can merge the sub-picture video streams into the spherical video stream for presentation to the user as a VR video sequence. The decoder can then forward the VR video sequence to a rendering device, such as rendering device 109.

At step 215, the rendering device renders a viewport of the spherical video stream for presentation to the user. As mentioned above, areas of the VR video sequence outside of the FOV at each point in time are not rendered.

Figure 3:
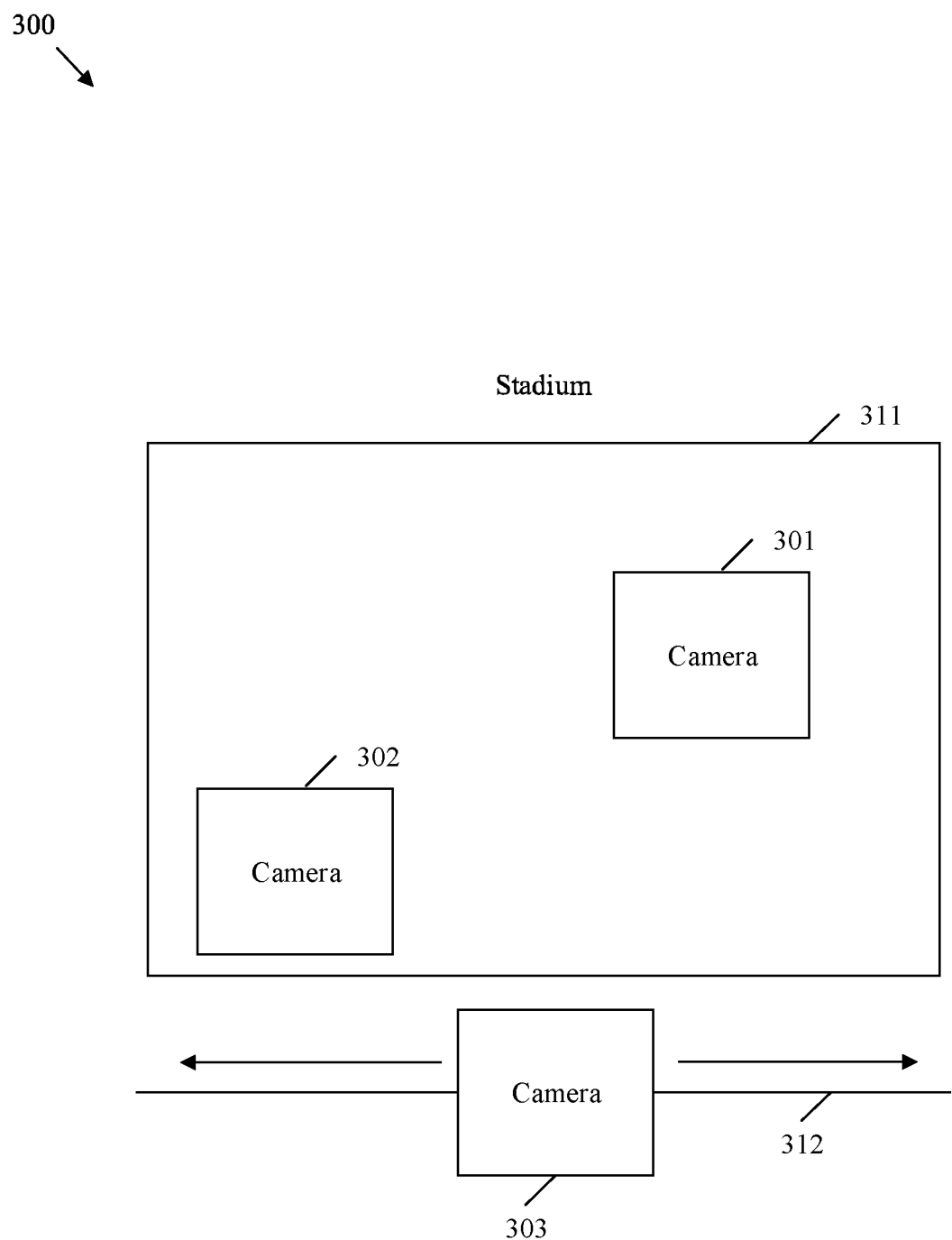
FIG. 3 is a schematic diagram of an example system for recording VR based video with multiple viewpoints.

FIG. 3 is a schematic diagram of an example system 300 for recording VR-based video with multiple viewpoints. For example, system 300 can be employed to record VR video from a plurality of viewpoints. The video from each viewpoint can be separated into one or more adaptation sets, and then stored as representations of the corresponding adaptation set(s). Such adaptation sets and representations can be encoded and transmitted to the client for rendering, for example as discussed with respect to system 100 and/or method 200. Hence, system 300 can act as an embodiment of multi-directional cameras 101.

In an example, system 300 may be deployed in a stadium 311 hosting a sporting event. System 300 may employ a first stationary camera 301, a second stationary camera 302, and a mobile camera 303. Cameras 301-303 can be multi-directional cameras for recording VR sequences in some examples. Camera 301 is stationed at a first viewpoint and camera 302 is stationed at a second viewpoint that is different from the first viewpoint. Over the course of a sporting event in the stadium 311, camera 301 and camera 302 record the same environment from different viewpoints and hence provide different perspectives of the actions occurring during the sporting event in the stadium 311. Camera 303 may move as directed by stadium 311 staff. For example, camera 303 may be positioned on a rail 312 and may move to areas of particular interest over the course of the sporting event. For example, camera 303 can be moved adjacent to the location of a ball as the sporting event progresses in order to provide the best view of a game being played. Accordingly, camera 303 is associated with a changing viewpoint that is different from the viewpoints of cameras 301 and 302.

In an example, the video from the various cameras 301-303 can be provided in a manner that would allow a user to dynamically select a video stream from a corresponding viewpoint on demand. In a DASH scheme, the video and/or audio from each camera 301-303 can be saved in corresponding adaptation set(s) based on viewpoint. The video from each adaptation set corresponding to a viewpoint can be stored in representations of various qualities. Hence, a user can select a viewpoint based on data from an MPD and receive a representation of video from the viewpoint at a video quality that is appropriate for the user's network connection.

Further, a user may wish to relinquish control and allow a video producer to select the most relevant viewpoint as the sporting event progresses. This can be accomplished by employing a timed metadata track (e.g., a hint track). The timed metadata track is stored as a separate representation in a separate adaptation set. For example, the time metadata track can indicate that a specified FOV at the viewpoint of camera 301 contains the most interesting video (e.g., a player carrying a ball) at a first time period, indicate an FOV at the viewpoint of camera 302 at a second time period, indicate an FOV at the viewpoint of camera 303 at a third time period, etc. In this manner, a client can read the timed metadata track and obtain an appropriate representation from the viewpoint indicated by the timed metadata track for display to the user over the course of the sporting event as directed by a video producer.

In this scenario, every representation at every viewpoint (e.g., at every adaptation set) is associated with the timed metadata track. When many viewpoints and many video qualities are employed, the number of associations between the timed metadata track and the corresponding representations becomes significant. Such associations are noted in the MPD file, which may substantially increase the file size of the MPD file. Accordingly, the present disclosure describes mechanisms to denote associations between various DASH objects in addition to a representation-to-representation association. For example, the viewpoints of the three cameras 301-303 can be associated with the timed metadata track representation and/or adaptation set. This reduces the number of associations from three times the number of available video qualities to three in the example depicted. Various DASH objects and associations between such objects to address these issues are discussed with respect to the figures below.

Figure 4:
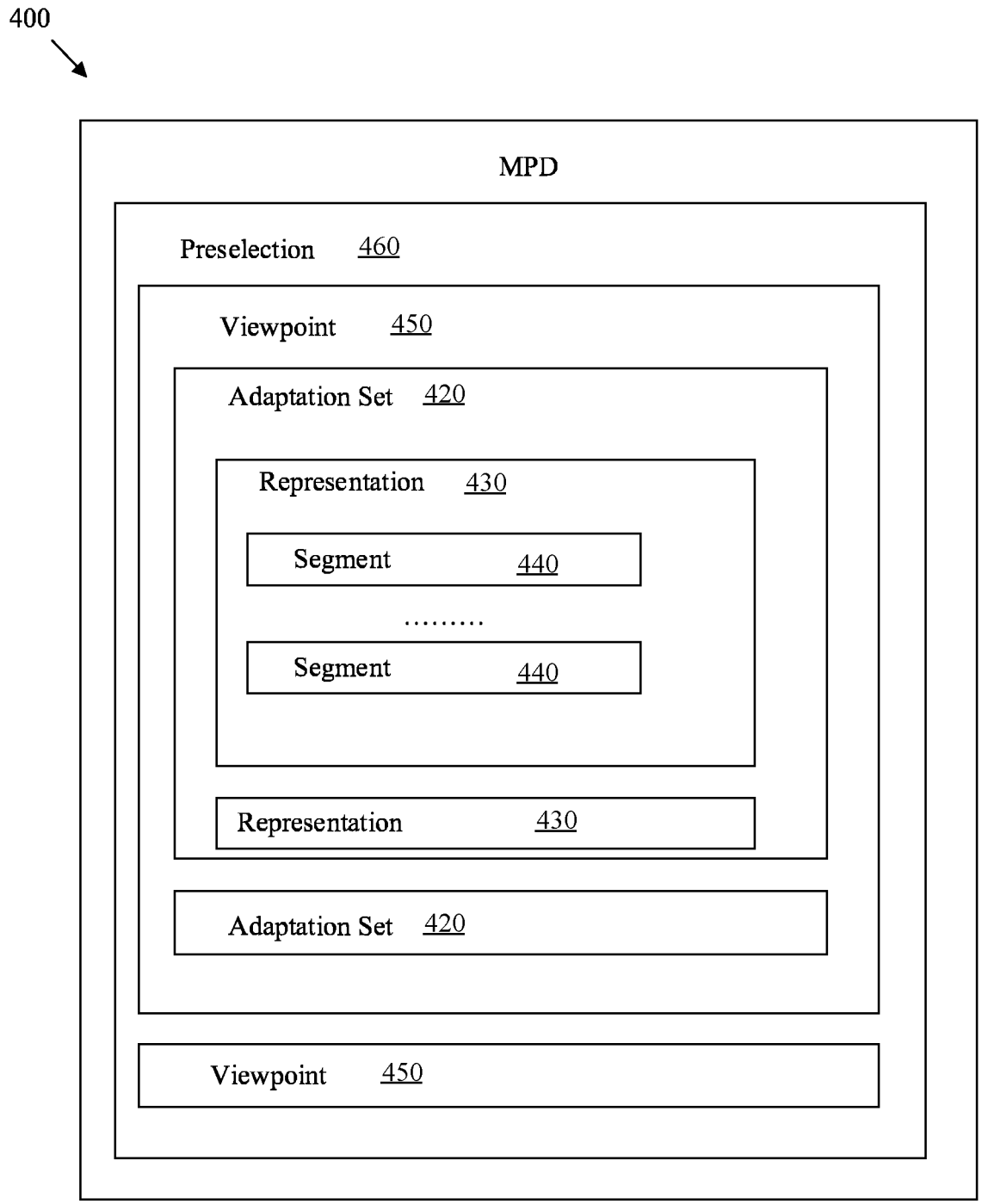
FIG. 4 is a schematic diagram of an example DASH MPD that may be employed for streaming VR video with multiple viewpoints.

FIG. 4 is a schematic diagram of an example DASH MPD 400 that may be employed for streaming VR video with multiple viewpoints. For example, MPD 400 can be used to describe video recorded by system 300 when applying method 200 and/or system 100. Hence, MPD 400 can be used as an MPD 125.

MPD 400 can include one or more preselections 460. A preselection 460 is a grouping of content that is selected (e.g., by a video producer) to be experienced together. For example, a preselection 460 may include video, corresponding audio, corresponding sub-titles, corresponding haptic feedback, etc. For example, a preselection 460 can include a plurality of adaptation sets 420.

The MPD 400 can also include one or more viewpoints 450. A viewpoint 450 includes adaptation sets 420 that are associated with (e.g., recorded from) a common position/camera. For example, a viewpoint 450 may include any version of data recorded completely from camera 301 (a first viewpoint 450), completely from camera 302 (a second viewpoint 450), or completely from camera 303 (a third viewpoint 450). A viewpoint 450 may include one or more adaptation sets 420. For example, a viewpoint 450 may include an adaptation set 420 for audio recorded at a position, an adaptation set 420 for video at the position, an adaptation set 420 for metadata related to the position, etc. A viewpoint 450 may or may not be part of a preselection 460, depending on choices made by a content producer.

An adaptation set 420 contains one or more representations 430. Specifically, an adaptation set 420 contains representations 430 that are of a common type and that can be rendered interchangeably. For example, audio data, video data, and metadata would be positioned in different adaptation sets 420 as a type of audio data cannot be swapped with a type of video data without affecting the media presentation. Further, video from different viewpoints 450 are not interchangeable as such videos contain different images.

Representations 430 contain media data that can be rendered to create a part of a multi-media presentation. In the video context, representations 430 in the same adaptation set 420 may contain the same video at different resolutions. Hence, such representations 430 can be used interchangeably depending on the desired video quality. In the audio context, representations 430 in a common adaptation set 420 may contain audio of varying quality as well as audio tracks in different languages. A representation 430 in an adaptation set 420 can also contain metadata such as a timed metadata track (e.g., a hint track). Hence, a representation 430 containing the timed metadata can be used in conjunction with a corresponding video representation 430, an audio representation 430, a closed caption representation 430, etc. to determine how such media representations 430 should be rendered. For example, the timed metadata representation 430 may indicate a preferred viewpoint 450 and a preferred viewport from the viewpoint 450 over time. Hence, a timed metadata representation 430 may indicate which adaptation sets 420 should be obtained and rendered as the media presentation progresses.

Representations 430 may contain segments 440. A segment 440 contains media data for a predetermined time period (e.g., three seconds). Accordingly, a segment 440 may contain a portion of audio data, a portion of video data, etc. that can be accessed by a predetermined URL over a network. The MPD 400 contains data indicating the URL for each segment 440. Accordingly, a client can select the desired preselection 460 and/or viewpoint 450 to determine the adaptation set(s) 420 that should be rendered. The client can then determine the representations 430 that should be obtained based on current network congestion. The client can then request the corresponding segments 440 in order to render the media presentation for the user.

I. Signaling Associations Between Representations

In DASH, associated representations 430 can be described by a representation 430 syntax element that contains an association ID (@associationId) attribute and optionally an association type (@associationType) attribute. Associated representations 430 are representations 430 that provide information on their relationships with other representations 430. The segments 440 of an associated representation 430 may be optional for decoding and/or presentation of the representations 430 identified by @associationId. Such segments 440 can be considered as supplementary or descriptive information, the type of the association being specified by the @associationType attribute. It should be noted that @associationId and @associationType attributes are used between representations 430 that are not in the same adaptation sets 420 (e.g., in different adaptation sets 420). As shown above, a timed metadata representation 430 is potentially related to every other representation 430 in the MPD 400. When multiple viewpoints 450 are employed, the number of representations 430 may be large. In this case, syntax indicating a representation 430 to representation 430 association may employ a large amount of data to indicate a timed metadata representation 430 association with each other representation 430. Specifically, in a representation 430 to representation 430 example, the @associationId attribute would contain the values of the identifier (@id) attributes of all the representations 430.

The present disclosure employs various example signaling mechanisms to overcome this issue and efficiently signal associations between representations. In a first example embodiment, the @associationId attribute may contain the @id attribute of an adaptation set 420 (e.g., AdaptationSet@id). When a particular value of AdaptationSet@id is contained in the @associationId attribute, the AdaptationSet@id value should be unique among the values of the @id attribute of all adaptation sets 420 and all representations 430 in the MPD 400 and unique among ID values of any other types of objects such as viewpoints 450 or preselections 460 that are allowed to be contained in the @associationId attribute. An optional adaptation set 420 level attribute may be added for indicating whether such uniqueness of the value of AdaptationSet@id for an adaptation set 420 is satisfied. The first example embodiment may be implemented as follows:

In this embodiment, associated representations 430, @associationId attributes, and @associationType attributes are specified as follows. Associated representations 430 are described by a representation 430 element that contains an @associationId attribute and optionally an @associationType attribute. Associated representations 430 are representations 430 that provide information on their relationships with other representations 430 or adaptation sets 420. The segments 440 of an associated representation 430 may be optional for decoding and/or presentation of the representations 430 or adaptation sets 420 identified by @associationId. They can be considered as supplementary or descriptive information, the type of the association being specified by the @associationType attribute. It should be noted that, in this embodiment, @associationId and @associationType attributes can only be used between representations 430 that are not in the same adaptation set 420. The @associationId attribute and @associationType attribute may be defined by Table 1:

TABLE 1

| @associationId and @associationType attributes | | |
|---|---|---|
| @associationId | O | specifies all Representations or Adaptation Sets the Representation is associated with in the decoding and/or presentation process as a whitespace-separated list of values of Representation@id or AdaptationSet@id attributes. When an AdaptationSet@id value is contained in an @associationId attribute, the AdaptationSet@id value |

TABLE 1-continued

| @associationId and @associationType attributes | | |
|---|---|---|
| | | shall be unique among the values of the @id attribute of all Adaptation Sets and all Representations in the MPD. |
| @associationType | O | specifies, as a whitespace separated list of values, the kind of association for each Representation or Adaptation Set the Representation has been associated with through the @associationId attribute. Values taken by this attribute are 4 character codes for track reference types registered in MP4 registration authority. This attribute shall not be present when @associationId is not present. When present, this attribute must have as many values as the number of identifiers declared in the @associationId attribute. |

In this embodiment, carriage of timed metadata track for OMAF is specified as follows. A timed metadata track (e.g., of track sample entry type 'invo' or 'rcvp') may be encapsulated in a DASH representation 430. The @associationId attribute of this metadata representation 430 may contain the values of the attribute @id of the representations 430 or adaptation sets 420 containing omnidirectional media carried by media track(s) that are associated with the timed metadata track. The @associationType attribute of this metadata representation 430 may be set equal to 'cdsc'.

In this embodiment, an optional adaptation set 420 level attribute may be specified in Table 2.

TABLE 2

| @idUniqueFlag attribute | | |
|---|---|---|
| @idUniqueFlag | OD default: false | When this flag is set to 'true', the value of the @id attribute of this Adaptation Set shall be unique among the values of the @id attribute of all Adaptation Sets and all Representations in the MPD. When this flag is set to 'false', the above constraint may or may not apply. |

The ID unique flag (@idUniqueFlag) attribute provides a mechanism for indicating whether the value of AdaptationSet@id is unique for an adaptation set 420.

In a second example embodiment, a representation 430 level attribute, which may be denoted as an association adaptation set ID (@associationAsId), is defined to associate a containing representation 430 to one or more adaptation sets 420. In this embodiment, associated representations 430, @associationId attributes, @associationAsId attributes, and @associationType attributes are specified as follows. Associated representations 430 are described by a representation 430 element that contains an @associationId or @associationAsId attribute and optionally an @associationType attribute. Associated representations 430 are representations 430 that provide information on their relationships with other representations 430 or adaptation sets 420. The segments 440 of an associated representation 430 may be optional for decoding and/or presentation of the representations 430 or adaptation sets 420 identified by @associationId or @associationAsId. The segments 440 can be considered as supplementary or descriptive information, the type of the association being specified by the @associationType attribute. It should be noted that @associationId or @associationAsId and @associationType attributes may only be used between representations 430 that are not in the same adaptation set 420. The @associationId attribute, @associationAsId attribute, and @associationType attribute may be defined in Table 3:

TABLE 3

@associationId, @associationAsId, and @associationType attributes

| | | |
|---|---|---|
| @associationId | O | specifies all Representations the Representation is associated with in the decoding and/or presentation process as a whitespace-separated list of values of Representation@id attributes. |
| @associationAsId | O | specifies all Adaptation Sets the Representation is associated with in the decoding and/or presentation process as a whitespace-separated list of values of AdaptationSet@id attributes. |
| @associationType | O | specifies, as a whitespace separated list of values, the kind of association for each Representation or Adaptation Set the Representation has been associated with through the @associationId or @associationAsId attribute, respectively. Values taken by this attribute are 4 character codes for track reference types registered in MP4 registration authority. This attribute shall not be present when @associationId is not present. When present, this attribute must have as many values as the number of identifiers declared in the @associationId attribute. |

In this embodiment, carriage of timed metadata track for OMAF can be specified as follows. A timed metadata track (e.g., of track sample entry type 'invo' or 'rcvp') may be encapsulated in a DASH representation 430. The @associationId or @associationAsId attribute of this metadata representation 430 shall contain the values of the attribute @id of the representations 430 or adaptation sets 420, respectively, containing the omnidirectional media carried by the media track(s) that are associated with the timed metadata track. The @associationType attribute of this metadata representation may be set equal to 'cdsc'. This embodiment may also employ an @idUniqueFlag attribute as discussed in the first embodiment.

The first two example embodiments allow representation 430 attributes to associate to adaptation sets 420, which can be employed to allow an entire adaptation set 420 to associate with a representation 430 containing a timed metadata track. In this way, timed metadata track can refer to entire video track groups rather than to each and every representation 430, which significantly reduces MPD 400 file size.

A third example embodiment is similar to the first example embodiment, but allows a representation 430 to associate with an entire viewpoint 450. In this embodiment, the @associationId attribute may contain the value of a viewpoint 450 ID. When a particular viewpoint 450 ID value is contained in the @associationId attribute, the viewpoint 450 ID value should be unique among the values of the @id attribute of all viewpoints 450 and all representations 430 in the MPD 400 and unique among ID values of any other types of objects such as adaptation sets 420 or preselections 460 that are allowed to be contained in the @associationId attribute. A field may be included in a Viewpoint@value attribute for indicating whether such uniqueness of the viewpoint 450 ID value is satisfied. The other values may be as described in the first example embodiment with mentions of adaptation set 420 exchanged with viewpoint 450.

A fourth example embodiment is similar to the second example embodiment, but provides a representation 430 level attribute, which may be denoted as an association viewpoint ID (@associationVwptId), defined to associate a containing representation 430 to one or more viewpoints 450. The other values may be as described in the second example embodiment with mentions of adaptation set 420 exchanged with viewpoint 450.

A fifth example embodiment is similar to the first example embodiment, but allows a representation 430 to associate with a preselection 460. In this embodiment, the @associationId attribute may contain the @id attribute of a preselection 460 (e.g., Preselection@id). When a particular preselection 460 ID value is contained in the @associationId attribute, the preselection 460 ID value should be unique among the values of the @id attribute of all preselections 460 and all representations 430 in the MPD 400 and unique among ID values of any other types of objects such as adaptation sets 420 or viewpoints 450 that are allowed to be contained in the @associationId attribute. An optional attribute may be added to an XML schema of the preselection 460 element for indicating whether such uniqueness of the value of Preselection@id for a preselection 460 is satisfied. The other values may be as described in the first example embodiment with mentions of adaptation set 420 exchanged with preselection 460.

A sixth example embodiment is substantially similar to the second example embodiment, but provides a representation 430 level attribute, which may be denoted as an association preselection 460 ID (@associationPsId), defined to associate a containing representation 430 to one or more preselections 460. The other values may be as described in the second example embodiment with mentions of adaptation set 420 exchanged with preselection 460.

In a seventh example embodiment, the attributes of example embodiments one, two, three, four, five, and/or six are implemented as attributes at other levels of the MPD 400. Specifically, the @associationId attribute, the @associationAsId attribute, the @associationPsId attribute, and/or the @associationVwptId attribute, as discussed above, can be implemented as attribute(s) of an adaptation set 420, a preselection 460, and/or a viewpoint 450. This allows adaptation sets 420, preselections 460, and/or viewpoints 450 to associate with other DASH objects, such as other adaptation sets 420, preselections 460, and/or viewpoints 450.

With any of embodiments one through seven, an efficient signaling of the associated representations 430, adaptation sets 420, preselections 460, or viewpoints 450 for a representation 430 (e.g., a timed metadata representation 430) or some other DASH object can be achieved, without significantly increasing the size of the MPD 400.

A specific example implementation is as follows. A timed metadata representation may be associated with one or more media representations through collective association. A timed metadata representation may be collectively associated with all media representations of a sub-picture composition as follows. An association descriptor is present as a child element of the DASH Representation element of the timed metadata representation. The association descriptor should include one string in the association element of the type AdaptationSet [SubPicCompositionId="aa"], where "aa" indicates a sub-picture composition identifier value. Further, 'cdtg' can be included as the value of an Association@associationKindList attribute of the association element. Specifically, a timed metadata track containing a 'cdtg' track reference describes the referenced media tracks and track groups collectively. The 'cdtg' track reference may only be present in timed metadata tracks.

II. Signaling Viewpoint IDs

Some systems may have difficulty determining if two viewpoints 450 are in fact the same viewpoint 450 as some viewpoints 450 can move over the course of a video, resulting in changes to corresponding position information. In addition, DASH lacks a single MPD descriptor that indicates both static viewpoints and dynamic viewpoints. Furthermore, there lacks a means for such a descriptor to have a single value that indicates whether associated viewpoints are static or dynamic. The following may address those issues.

In a first example embodiment, when two viewpoint 450 elements both have an @value attribute containing the same value of viewpoint 450 ID, then the @value attributes of the two viewpoint 450 elements can be considered as equivalent regardless of position information. With this, a system can determine whether multiple DASH objects (e.g., adaptation sets 420) that contain an instance of a viewpoint 450 element can be considered as belonging to the same viewpoint 450, and thus avoid erroneously switching viewpoints 450 when not needed or vice versa.

In a second example embodiment, to support a case of multiple viewpoints in DASH, the existing viewpoint 450 element should be used, but a viewpoint scheme is defined. Specifically, in the MPD 400, a viewpoint element with an @schemeIdUri attribute equal to "urn:mpeg:mpegI:omaf:2018:vwpt" is referred to as a viewpoint information (VWPT) descriptor. The VWPT descriptor is defined to signal a viewpoint 450 in the MPD 400. The same descriptor can be used for viewpoints 450 with both static and dynamic, or temporally changing, positions. In an example, at most one VWPT descriptor may be present at the adaptation set 420 level, and no VWPT descriptor shall be present at any other level. The VWPT descriptor indicates the viewpoint 450 the adaptation set 420 belongs to and whether the position of the viewpoint 450 is static or dynamic. If static, the position of the viewpoint 450 is also provided by the VWPT descriptor. The @value attribute of the VWPT descriptor is a comma-separated list of values as specified in Table 4:

TABLE 4

@value attribute of VWPT descriptor

| @value attribute for VWPT descriptor | Use | Description |
| --- | --- | --- |
| viewpoint_id | M | Specifies viewpoint ID of the viewpoint. The value of this field shall be equal to the value of track_group_id within TrackGroupTypeBox with track_group_type equal to 'vipo' for the media tracks that belong to this viewpoint. |
| is_static | M | The value equal to 'true' indicates that the position of the viewpoint is static. The value equal to 'false' indicates that the position of the viewpoint is dynamic. |
| center_x | O | The value specifies the absolute position of the center of the viewpoint in global three-dimensional coordinates on the X axis in units of centimeters. This field shall be present when is_static is 'true,' and shall not be present when is is_static is 'false.' |
| center_y | O | The value specifies the absolute position of the center of the viewpoint in global three-dimensional coordinates on the Y axis in units of centimeters. This field shall be present when is_static is 'true,' and shall not be present when is is_static is 'false.' |
| center_z | O | The value specifies the absolute position of the center of the viewpoint in global three-dimensional coordinates on the Z axis in units of centimeters. This field shall be present when is static_is 'true,' and shall not be present when is is_static is 'false.' |

Legend:
M = Mandatory, O = Optional

When the position of the viewpoint 450 is dynamic as indicated by is_static equal to 'false,' the dynamic position of the viewpoint 450 shall be provided by a timed metadata representation 430 containing a timed metadata track that has a particular sample entry type such as 'vpps.' The @associationId attribute of this timed metadata representation 430 shall contain the value of the viewpoint_id of the @value attribute of the VWPT descriptor for the viewpoint 450. In addition, the @associationType attribute of this metadata representation 430 shall be set to 'cdsc.'

The is_static value may be the only value in the VWPT descriptor that indicates whether the position of the viewpoint 450 is static or dynamic.

III. Associating Timed Metadata Representations to Entire Media Presentations.

Timed metadata representations often apply to entire media presentations. However, DASH lacks a way to associate timed metadata representations to entire media presentations. The following may address that issue. In an example embodiment, it is allowed for a timed metadata representation 430 to have none of, or omit or be independent of, an @associationId attribute, an @associationAsId attribute, an @associationVwptId attribute, an @associationPsId attribute, and any other such attribute for association of the timed metadata representation 430 to other DASH objects. Thus, it is specified that the timed metadata representation 430 applies to the entire media presentation.

IV. Associating Timed Metadata Tracks to Entire Movies.

OMAF includes the following specifications that are for or can be used for association of timed metadata tracks to media tracks or track groups. When a timed metadata track is linked to one or more media tracks with a 'cdsc' track reference, it describes each media track individually. Bit 0 of the flags (with bit 0 being the least significant bit) of the TrackGroupTypeBox is used to indicate the uniqueness of track_group_id. The semantics of the flag is specified as follows:

(flags & 1) equal to 1 in a TrackGroupTypeBox of a particular track_group_type indicates that track_group_id in that TrackGroupTypeBox is not equal to any track_ID value and is not equal to track_group_id of any TrackGroupTypeBox with a different track_group_type. When (flags & 1) is equal to 1 in a TrackGroupTypeBox with particular values of track_group_type and track_group_id, (flags & 1) shall be equal to 1 in all TrackGroupTypeBoxes of the same values of track_group_type and track_group_id, respectively.

The semantics of track_IDs of the TrackReferenceBox is changed from:

track_IDs is an array of integers providing the track identifiers of the referenced tracks. The value 0 shall not be present. A given value shall not be duplicated in the array.

to:

track_IDs is an array of integers providing the track identifiers of the referenced tracks or track_group_id values of the referenced track groups. Each value of track_IDs[i], where i is a valid index to the track_IDs[ ] array, is an integer that provides a reference from the containing track to the track with track_ID equal to track_IDs[i] or to the track group with both track_group_id equal to track_IDs[i] and (flags & 1) of TrackGroupTypeBox equal to 1. When a track_group_id value is referenced, the track reference applies to each track of the referenced track group individually unless stated otherwise in the semantics of particular track reference types. The value 0 shall not be present. A given value shall not be duplicated in the array.

Timed metadata tracks often apply to entire movies. However, file formats lack a way to associate timed metadata tracks to entire movies. The following may address that issue. In an example embodiment, it is allowed for a timed metadata track to have no, or omit or be independent of, a 'cdsc' track reference. Thus, it is specified that the timed metadata track applies to the entire movie.

Figure 5:
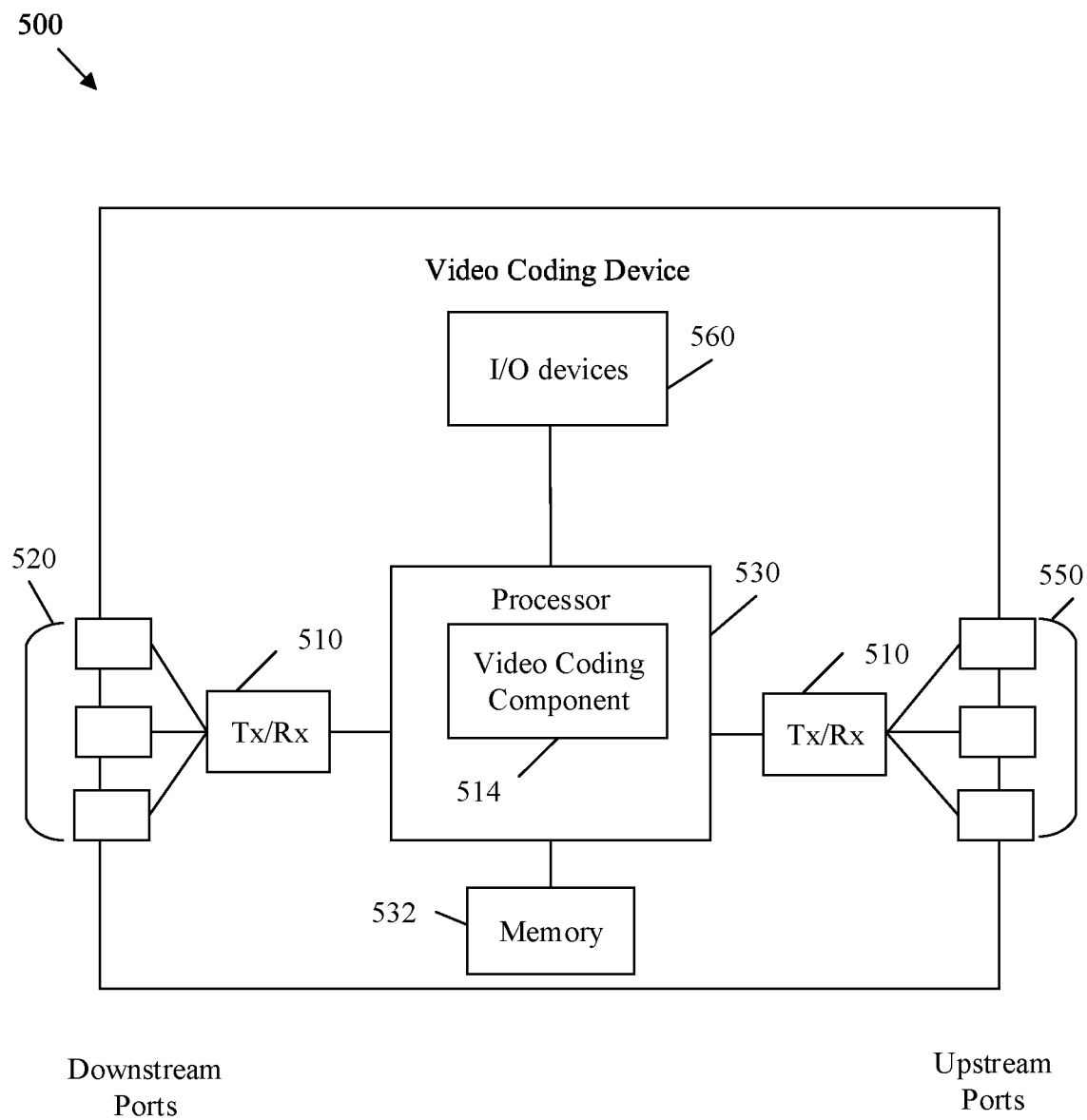
FIG. 5 is a schematic diagram illustrating an example video coding device.

FIG. 5 is a schematic diagram illustrating an example video coding device 500. The video coding device 500 is suitable for implementing the disclosed examples/embodiments as described herein. The video coding device 500 comprises downstream ports 520, upstream ports 550, and/or Tx/Rx 510, including transmitters and/or receivers for communicating data upstream and/or downstream over a network. The video coding device 500 also includes a processor 530 including a logic unit and/or CPU to process the data and a memory 532 for storing the data. The video coding device 500 may also comprise OE components, EO components, and/or wireless communication components coupled to the upstream ports 550 and/or downstream ports 520 for communication of data via optical or wireless communication networks. The video coding device 500 may also include I/O devices 560 for communicating data to and from a user. The I/O devices 560 may include output devices such as a display for displaying video data, speakers for outputting audio data, etc. The I/O devices 560 may also include input devices, such as a keyboard, mouse, trackball, etc., and/or corresponding interfaces for interacting with such output devices.

The processor 530 is implemented by hardware and software. The processor 530 may be implemented as one or more CPU chips, cores (e.g., as a multi-core processor), FPGAs, ASICs, and DSPs. The processor 530 is in communication with the downstream ports 520, Tx/Rx 510, upstream ports 550, and memory 532. The processor 530 comprises a video coding component 514. The video coding component 514 may implement all or part of the disclosed embodiments described herein. For example, the video coding component 514 can be employed to implement the functionality of a video coding device 104, an encoder 103, a DASH content server 111, a client 108, and/or a decoder 107, depending on the example. For example, the video coding component 514 can implement relevant portions of method 200. As another example, the video coding component 514 can receive VR video (e.g., omnidirectional video) from cameras 301, 302, and/or 303 and generate an MPD 400 of file format object to support streaming of multi-viewpoint VR video via a streaming system. Further, video coding component 514 can encode an MPD with syntax associating a representation 430, an adaptation set 420, a viewpoint 450, and/or a preselection 460 with another representation 430, adaptation set 420, viewpoint 450, and/or preselection 460, for example to associate a DASH object with a timed metadata track without encoding an association for every single representation 430. This reduces the file size of the MPD, reduces the processing resources to generate and/or process the MPD, reduces the network resources to transmit the MPD, and/or reduces the memory resources to store the MPD. As such, the video coding component 514 improves the functionality of the video coding device 500 and addresses problems that are specific to the video coding arts. Further, the video coding component 514 effects a transformation of the video coding device 500 to a different state. Alternatively, the video coding component 514 can be implemented as instructions stored in the memory 532 and executed by the processor 530 (e.g., as a computer program product stored on a non-transitory medium).

The memory 532 comprises one or more memory types such as disks, tape drives, solid-state drives, ROM, RAM, flash memory, TCAM, SRAM, etc. The memory 532 may be used as an over-flow data storage device, to store programs when such programs are selected for execution, and to store instructions and data that are read during program execution.

Figure 6:
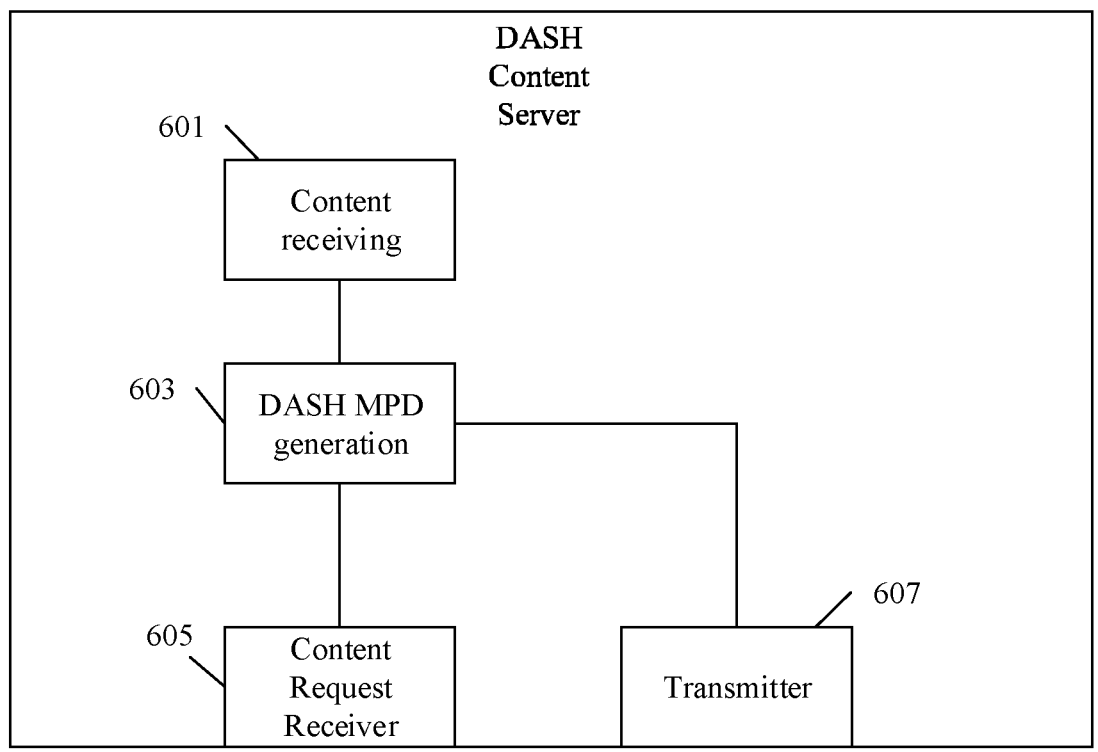
FIG. 6 is a schematic diagram of an example DASH content server for associating DASH objects in an MPD to support streaming of VR video with multiple viewpoints.

FIG. 6 is a schematic diagram of an example DASH content server 600 for associating DASH objects in an MPD, such as MPD 400 and/or MPD 125, to support streaming of VR video with multiple viewpoints, for example from a system 300. Hence, DASH content server 600 can used in conjunction with method 200 and/or in conjunction with the video coding component 514, to support distribution of multi-viewpoint VR media content by an encoder and/or a DASH content server, such as encoder 103 and/or DASH content server 111, respectively, in system 100.

The DASH content server 600 can include a content receiving module 601 for receiving media content including a VR video sequence, the media content described as a plurality of adaptation sets. The DASH content server 600 can also include a DASH MPD generation module 603 for generating a DASH MPD including an Association ID specifying that a portion of the media content is associated with a corresponding first viewpoint. The DASH content server 600 can also include a content request receiving module 605 for receiving a request from a client for the media content. The DASH content server 600 can also include a transmitter 607 for transmitting the DASH MPD including the Association ID to the client in response to receiving the request to support communication of the media content to the client.

Figure 7:
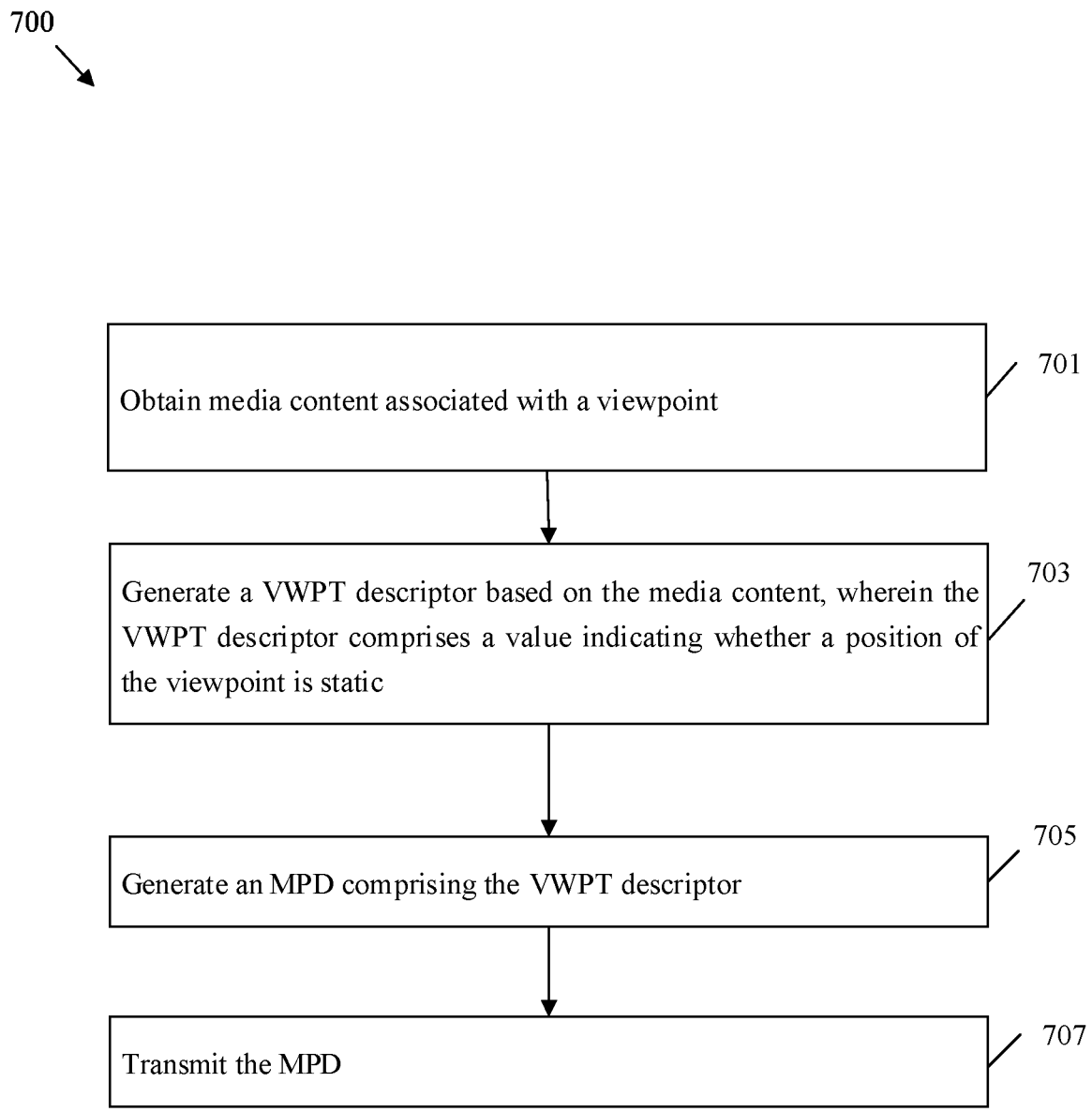
FIG. 7 is a flowchart illustrating a method of generating and transmitting an MPD according to an embodiment of the disclosure.

FIG. 7 is a flowchart illustrating a method 700 of generating and transmitting an MPD according to an embodiment of the disclosure. At step 701, media content associated with a viewpoint is obtained. At step 703, a VWPT descriptor is generated based on the media content. The VWPT descriptor comprises a value indicating whether a position of the viewpoint is static. For instance, the value is the is static value in Table 4. At step 705, an MPD comprising the VWPT descriptor is generated. Finally, at step 707, the MPD is transmitted.

Figure 8:
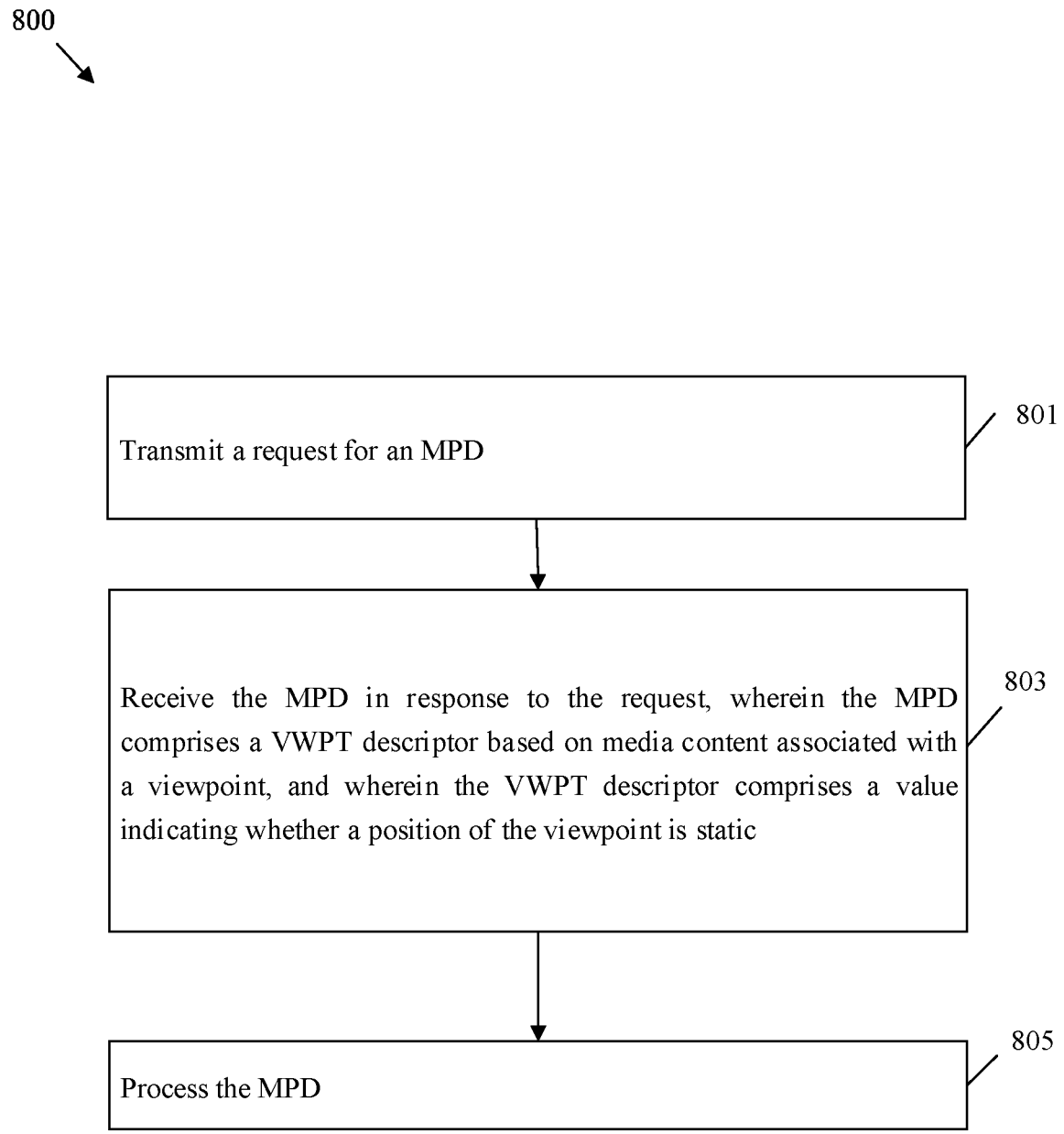
FIG. 8 is a flowchart illustrating a method of receiving and processing an MPD according to an embodiment of the disclosure.

FIG. 8 is a flowchart illustrating a method 800 of receiving and processing an MPD according to an embodiment of the disclosure. At step 801, a request for an MPD is transmitted. At step 803, the MPD is received in response to the request. The MPD comprises a VWPT descriptor based on media content associated with a viewpoint. The VWPT descriptor comprises a value indicating whether a position of the viewpoint is static. For instance, the value is the is static value in Table 4. Finally, at step 805, the MPD is processed.

Figure 9:
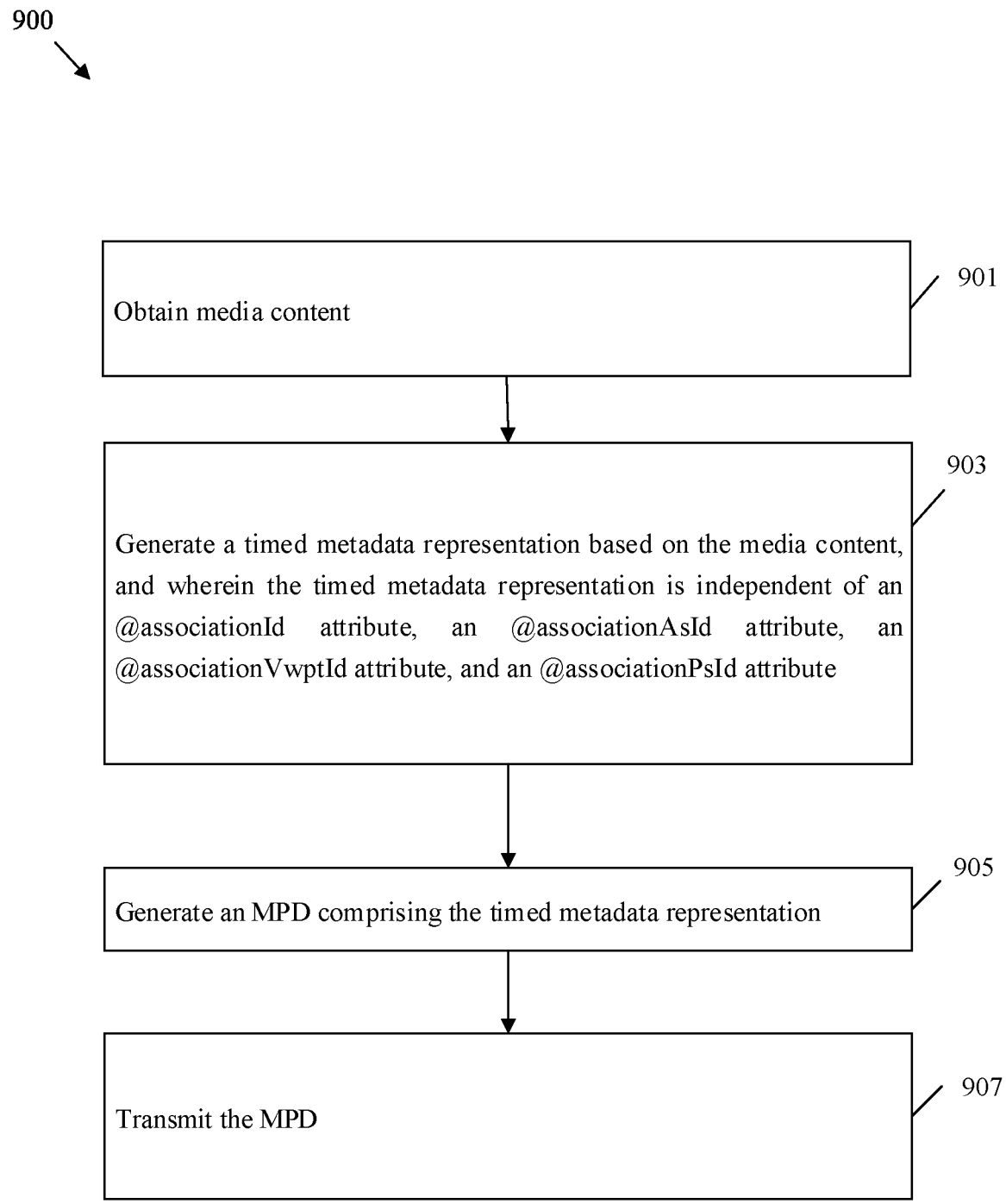
FIG. 9 is a flowchart illustrating a method of generating and transmitting an MPD according to another embodiment of the disclosure.

FIG. 9 is a flowchart illustrating a method 900 of generating and transmitting an MPD according to another embodiment of the disclosure. At step 901, media content is obtained. At step 903, a timed metadata representation is generated based on the media content. The timed metadata representation is independent of an @associationId attribute, an @associationAsId attribute, an @associationVwptId attribute, and an @associationPsId attribute. At step 905, an MPD comprising the timed metadata representation is generated. Finally, at step 907, the MPD is transmitted.

Figure 10:
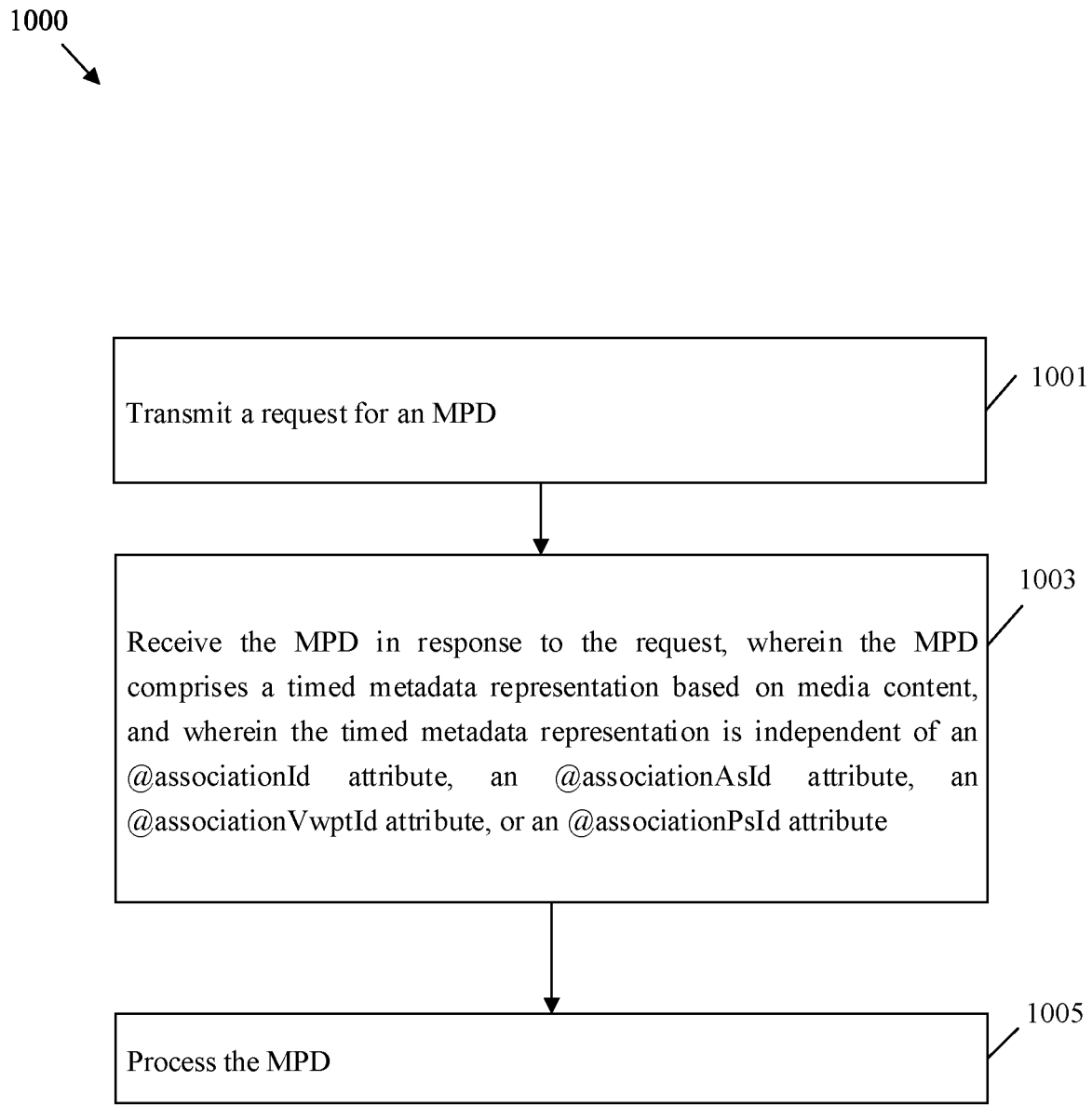
FIG. 10 is a flowchart illustrating a method of receiving and processing an MPD according to another embodiment of the disclosure.

FIG. 10 is a flowchart illustrating a method 1000 of receiving and processing an MPD according to another embodiment of the disclosure. At step 1001, a request for an MPD is transmitted. At step 1003, the MPD is received in response to the request. The MPD comprises a timed metadata representation based on media content. The timed metadata representation is independent of an @associationId attribute, an @associationAsId attribute, an @associationVwptId attribute, and an @associationPsId attribute. Finally, at step 1005, the MPD is processed.

Figure 11:
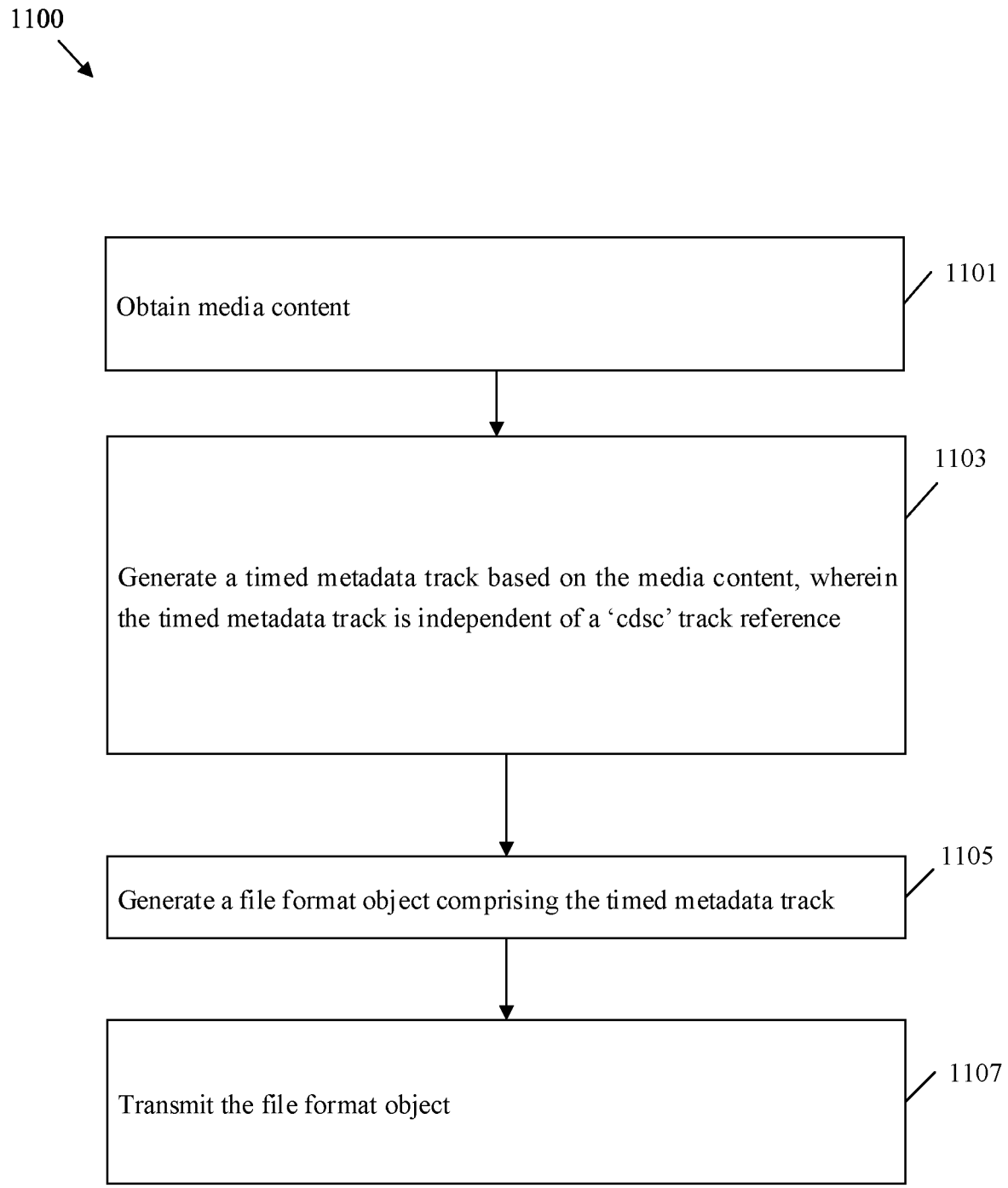
FIG. 11 is a flowchart illustrating a method of generating and transmitting a file format object according to an embodiment of the disclosure.

FIG. 11 is a flowchart illustrating a method 1100 of generating and transmitting a file format object according to an embodiment of the disclosure. At step 1101, media content is obtained. At step 1103, a timed metadata track is generated based on the media content. The timed metadata track is independent of a 'cdsc' track reference. At step 1105, a file format object comprising the timed metadata track is generated. Finally, at step 1107, the file format object is transmitted.

Figure 12:
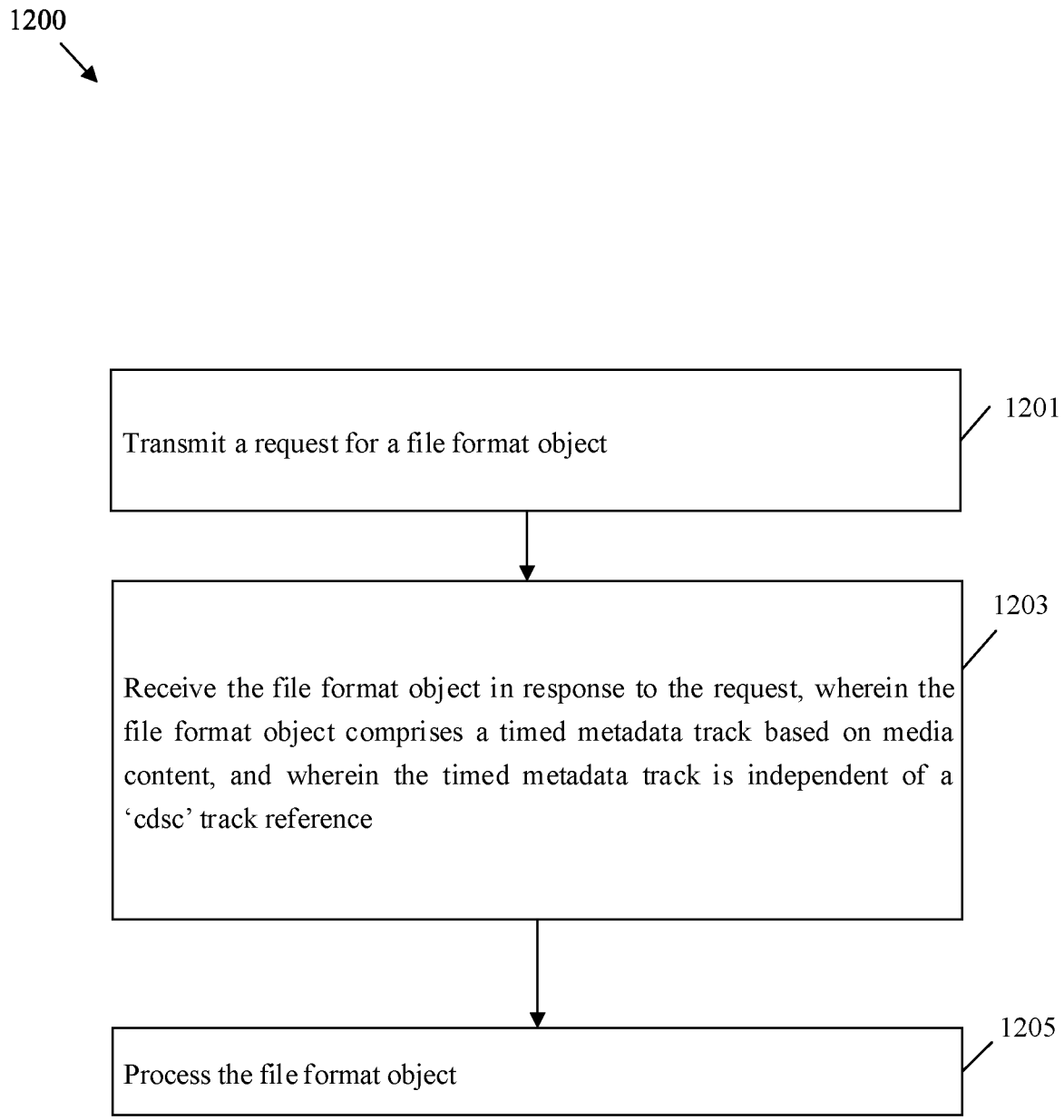
FIG. 12 is a flowchart illustrating a method of receiving and processing a file format object according to an embodiment of the disclosure.

FIG. 12 is a flowchart illustrating a method 1200 of receiving and processing a file format object according to an embodiment of the disclosure. At step 1201, a request for a file format object is transmitted. At step 1203, the file format object is received in response to the request. The file format object comprises a timed metadata track based on media content. The timed metadata track is independent of a 'cdsc' track reference. Finally, at step 1205, the file format object is processed.

Figure 13:
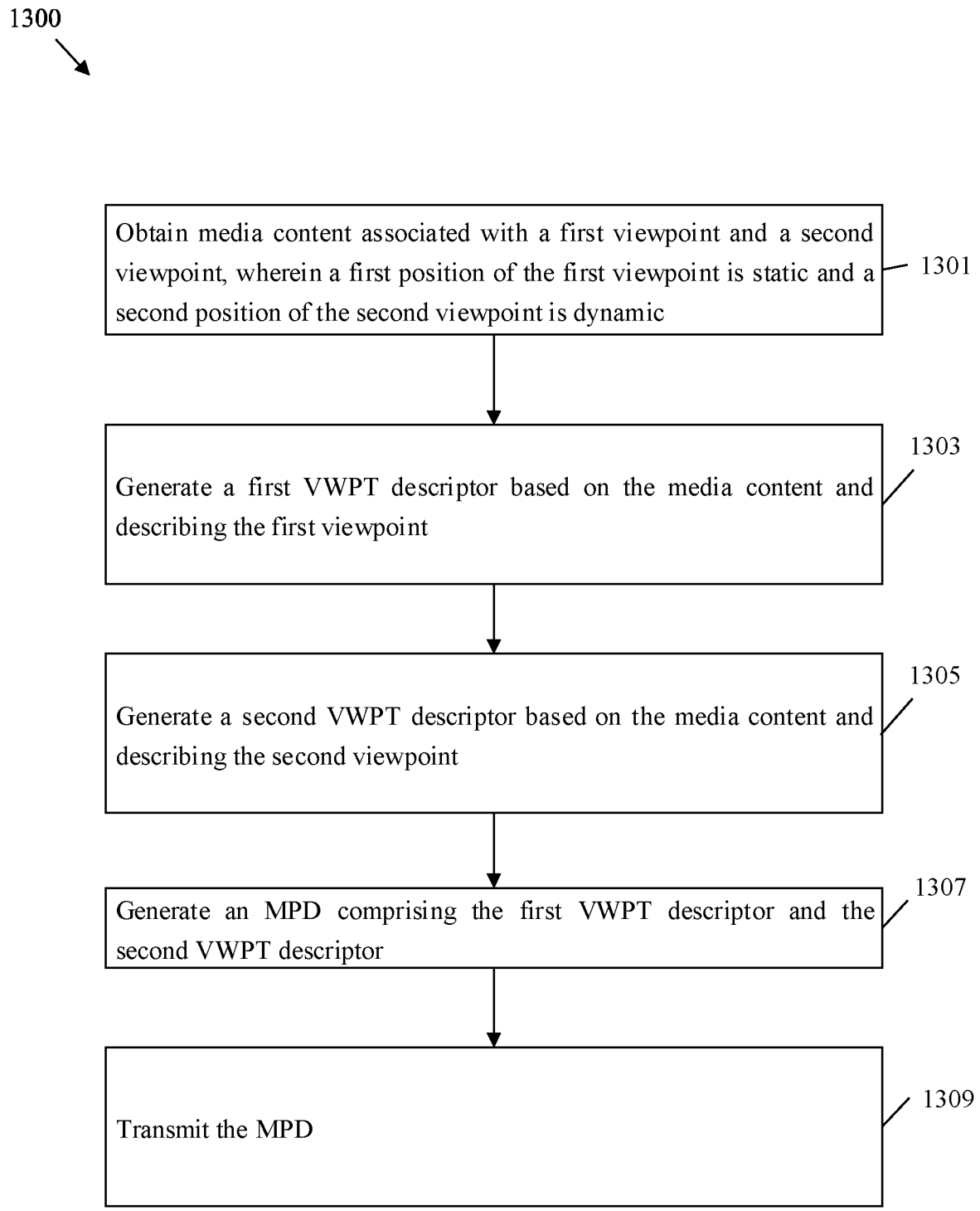
FIG. 13 is a flowchart illustrating a method of generating and transmitting an MPD according to yet another embodiment of the disclosure.

FIG. 13 is a flowchart illustrating a method 1300 of generating and transmitting an MPD according to an embodiment of the disclosure. At step 1301, media content associated with a first viewpoint and a second viewpoint is obtained. A first position of the first viewpoint is static, and a second position of the second viewpoint is dynamic. At step 1303, a first VWPT descriptor is generated based on the media content and describing the first viewpoint. At step 1305, a second VWPT descriptor is generated based on the media content and describing the second viewpoint. The first VWPT descriptor and the second VWPT descriptor may be the VWPT descriptor described with respect to Table 4. At step 1307, an MPD comprising the first VWPT descriptor and the second VWPT descriptor is generated. Finally, at step 1309, the MPD is transmitted.

The second viewpoint may be associated with a timed metadata representation comprising a timed metadata track. The timed metadata track comprises information describing the second position. The first VWPT descriptor may comprise a first value indicating whether the first position is static. The second VWPT descriptor may comprise a second value indicating whether the second position is static. The first value and the second value may be the is_static value in Table 4.

Figure 14:
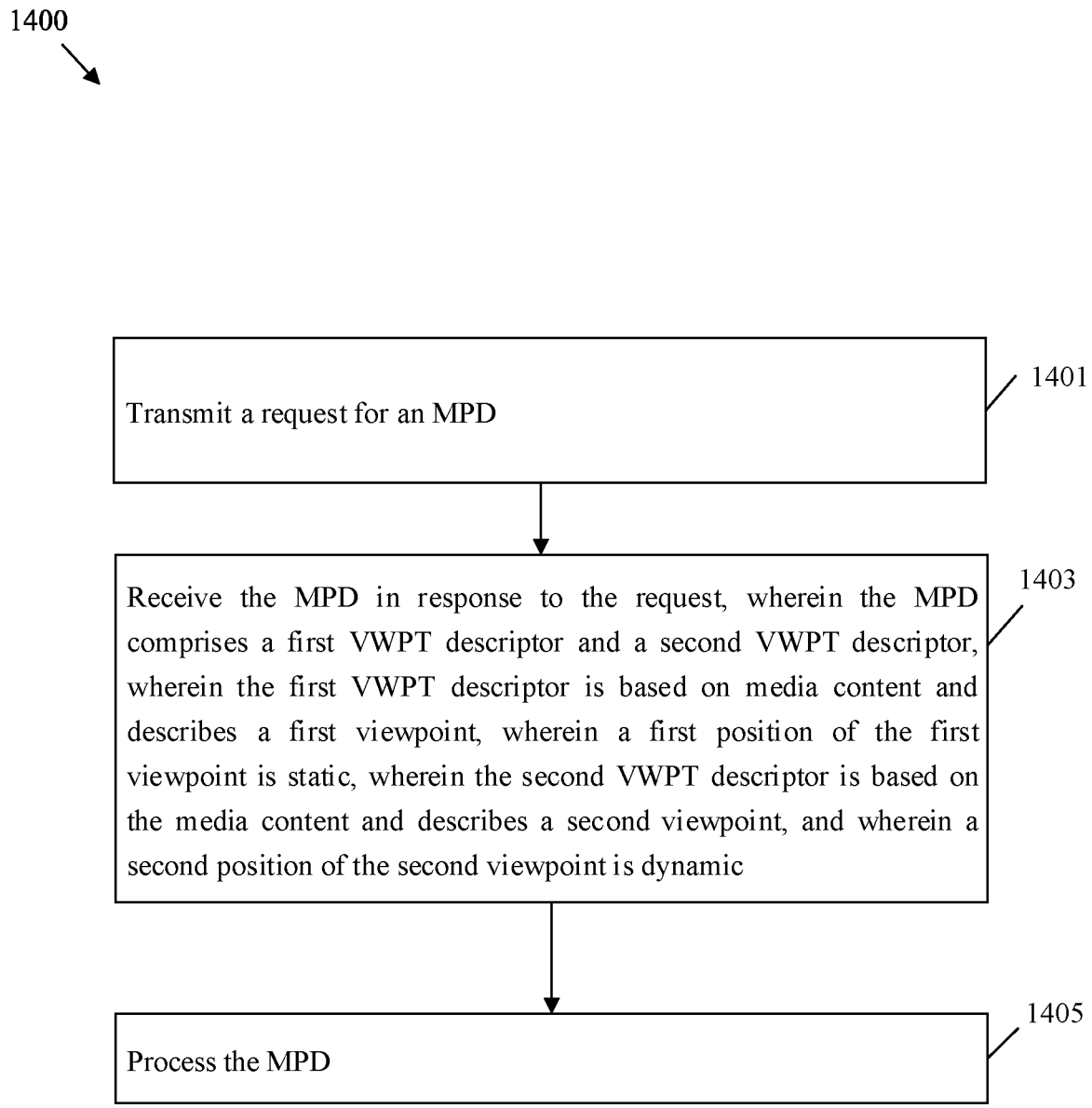
FIG. 14 is a flowchart illustrating a method of receiving and processing an MPD according to yet another embodiment of the disclosure.

FIG. 14 is a flowchart illustrating a method 1400 of receiving and processing an MPD according to yet another embodiment of the disclosure. At step 1401, a request for an MPD is transmitted. At step 1403, the MPD is received in response to the request. The MPD comprises a first VWPT descriptor and a second VWPT descriptor. The first VWPT descriptor is based on media content and describes a first viewpoint. A first position of the first viewpoint is static. The second VWPT descriptor is based on the media content and describes a second viewpoint. A second position of the second viewpoint is dynamic. The first VWPT descriptor and the second VWPT descriptor may be the VWPT descriptor described with respect to Table 4. Finally, at step 1405, the MPD is processed. For the methods 700-1400, the Tx/Rx 510 may perform receiving and transmitting steps, and the processor 530 may perform the remaining steps.

The second viewpoint may be associated with a timed metadata representation comprising a timed metadata track. The timed metadata track comprises information describing the second position. The first VWPT descriptor may comprise a first value indicating whether the first position is static. The second VWPT descriptor may comprise a second value indicating whether the second position is static. The first value and the second value may be the is_static value in Table 4.

An apparatus comprises a memory element and a processor element coupled to the memory element and configured to perform the following method: obtaining media content associated with a first viewpoint and a second viewpoint, wherein a first position of the first viewpoint is static and a second position of the second viewpoint is dynamic; generating a first VWPT descriptor based on the media content and describing the first viewpoint; generating a second VWPT descriptor based on the media content and describing the second viewpoint; generating an MPD comprising the first VWPT descriptor and the second VWPT descriptor; and transmitting the MPD.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
obtaining, by a coding device, media content associated with a viewpoint;
generating, by the coding device, a viewpoint information (VWPT) descriptor based on the media content, wherein the VWPT descriptor comprises a value indicating whether a position of the viewpoint is static and whether the position of the viewpoint is dynamic;
generating, by the coding device, a media presentation description (MPD) comprising the VWPT descriptor at an adaptation set level of the MPD, wherein no VWPT descriptor is present at any level of the MPD other than the adaptation set level; and
transmitting, by the coding device, the MPD.

2. The method of claim 1, wherein the value is an is_static value, and wherein the is_static value is the only value in the VWPT descriptor that indicates whether the position of the viewpoint is static or dynamic.

3. The method of claim 1, wherein the value being equal to "true" indicates that the position of the viewpoint is static, and wherein the value being equal to "false" indicates that the position of the viewpoint is dynamic.

4. The method of claim 1, wherein the VWPT descriptor further comprises a viewpoint identifier (ID) value that specifies a viewpoint ID of the viewpoint.

5. The method of claim 1, wherein the VWPT descriptor further comprises a center x value that specifies an absolute position of a center of the viewpoint in global three-dimensional coordinates on an x-axis, a center y value that specifies the absolute position of the center of the viewpoint in the global three-dimensional coordinates on a y-axis, and a center z value that specifies the absolute position of the center of the viewpoint in the global three-dimensional coordinates on a z-axis.

6. A method comprising:
obtaining, by a coding device, media content associated with a first viewpoint and a second viewpoint, wherein a first position of the first viewpoint is static and a second position of the second viewpoint is dynamic;
generating, by the coding device, a first viewpoint information (VWPT) descriptor based on the media content and describing the first viewpoint;
generating, by the coding device, a second VWPT descriptor based on the media content and describing the second viewpoint;
generating, by the coding device, a media presentation description (MPD) comprising the first VWPT descriptor and the second VWPT descriptor at an adaptation set level of the MPD, wherein no VWPT descriptor is present at any level of the MPD other than the adaptation set level; and
transmitting, by the coding device, the MPD.

7. The method of claim 6, wherein the second viewpoint is associated with a timed metadata representation comprising a timed metadata track, and wherein the timed metadata track comprises information describing the second position.

8. The method of claim 6, wherein the first VWPT descriptor comprises a first value indicating whether the first position is static, and wherein the second VWPT descriptor comprises a second value indicating whether the second position is static.

9. The method of claim 8, wherein the first value is a first is_static value that is the only value in the first VWPT descriptor that indicates whether the first position of the first viewpoint is static or dynamic, and wherein the second value is a second is_static value that is the only value in the second VWPT descriptor that indicates whether the second position of the second viewpoint is static or dynamic.

10. The method of claim 8, wherein the first value being equal to "true" indicates that the first position is static, wherein the second value being equal to "true" indicates that the second position is static, wherein the first value being equal to "false" indicates that the first position is dynamic, and wherein the second value being equal to "false" indicates that the second position is dynamic.

11. The method of claim 8, wherein the first VWPT descriptor further comprises a first viewpoint identifier (ID) value that specifies a first viewpoint ID of the first viewpoint, and wherein the second VWPT descriptor further comprises a second viewpoint ID value that specifies a second viewpoint ID of the second viewpoint.

12. The method of claim 8, wherein the first VWPT descriptor further comprises a first center x value that specifies a first absolute position of a first center of the first viewpoint in global three-dimensional coordinates on an x-axis, and wherein the second VWPT descriptor further comprises a second center x value that specifies a second absolute position of a second center of the second viewpoint in the global three-dimensional coordinates on the x-axis.

13. The method of claim 8, wherein the first VWPT descriptor further comprises a first center y value that specifies a first absolute position of a first center of the first viewpoint in global three-dimensional coordinates on a y-axis, and wherein the second VWPT descriptor further comprises a second center y value that specifies a second absolute position of a second center of the second viewpoint in the global three-dimensional coordinates on the y-axis.

14. The method of claim 8, wherein the first VWPT descriptor further comprises a first center z value that specifies a first absolute position of a first center of the first viewpoint in global three-dimensional coordinates on a z-axis, and wherein the second VWPT descriptor further comprises a second center z value that specifies a second absolute position of a second center of the second viewpoint in the global three-dimensional coordinates on the z-axis.

15. A coding device comprising:
a memory configured to store instructions; and
a processor coupled to the memory and configured to execute the instructions to cause the coding device to:
obtain media content associated with a viewpoint;
generate a viewpoint information (VWPT) descriptor based on the media content, wherein the VWPT descriptor comprises a value indicating whether a position of the viewpoint is static and whether the position of the viewpoint is dynamic;
generate a media presentation description (MPD) comprising the VWPT descriptor at an adaptation set level of the MPD, wherein no VWPT descriptor is present at any level of the MPD other than the adaptation set level; and
transmit the MPD.

16. The coding device of claim 15, wherein the value is an is_static value, and wherein the is_static value is the only value in the VWPT descriptor that indicates whether the position of the viewpoint is static or dynamic.

17. The coding device of claim 15, wherein the value being equal to "true" indicates that the position of the viewpoint is static, and wherein the value being equal to "false" indicates that the position of the viewpoint is dynamic.

18. A coding device comprising:
a memory configured to store instructions; and
a processor coupled to the memory and configured to execute the instructions to cause the coding device to:
obtain media content associated with a first viewpoint and a second viewpoint, wherein a first position of the first viewpoint is static and a second position of the second viewpoint is dynamic;
generate a first viewpoint information (VWPT) descriptor based on the media content and describing the first viewpoint;
generate a second VWPT descriptor based on the media content and describing the second viewpoint;
generate a media presentation description (MPD) comprising the first VWPT descriptor and the second VWPT descriptor at an adaptation set level of the MPD, wherein no VWPT descriptor is present at any level of the MPD other than the adaptation set level; and
transmit the MPD.

19. The coding device of claim 18, wherein the second viewpoint is associated with a timed metadata representation comprising a timed metadata track, and wherein the timed metadata track comprises information describing the second position.

20. The coding device of claim 18, wherein the first VWPT descriptor comprises a first value indicating whether the first position is static, and wherein the second VWPT descriptor comprises a second value indicating whether the second position is static.

* * * * *

UNITED STATES PATENT AND TRADEMARK OFFICE
CERTIFICATE OF CORRECTION

PATENT NO. : 11,902,634 B2
APPLICATION NO. : 17/063440
DATED : February 13, 2024
INVENTOR(S) : Ye-Kui Wang et al.

Page 1 of 1

It is certified that error appears in the above-identified patent and that said Letters Patent is hereby corrected as shown below:

On the Title Page

Item (56), second column, Other Publications:
Delete ""Information technology - Coded representation of immersive media (MPEG - I) - Part 2: Omnidirectional media format," MPEG Meeting, ISO/IEC JTC1/SC291WG11, No. n17399, Feb. 7, 2018, XP030024044, 181 pages."

And insert:
-- "Information technology - Coded representation of immersive media (MPEG - I) - Part 2: Omnidirectional media format," MPEG Meeting, ISO/IEC JTC1/SC29/WG11, No. n17399, Feb. 7, 2018, XP030024044, 181 pages. --

Signed and Sealed this
Second Day of April, 2024

Katherine Kelly Vidal
*Director of the United States Patent and Trademark Office*